(12) United States Patent
Kwon et al.

(10) Patent No.: US 6,747,428 B1
(45) Date of Patent: *Jun. 8, 2004

(54) DEVICE AND METHOD FOR CONTROLLING SUPPLY OF CURRENT AND STATIC CAPACITANCE TO COMPRESSOR

(75) Inventors: Soon Kwang Kwon, Pusan-shi (KR); Sung Yeob Lim, Kyongsangnam-do (KR); Gyeong Yeol Noh, Kyongsangnam-do (KR); Chang Woong An, Kyongsangnam-do (KR); Kam Gyu Lee, Pusan-shi (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/111,812
(22) PCT Filed: Oct. 18, 2000
(86) PCT No.: PCT/KR00/01168
§ 371 (c)(1),
(2), (4) Date: Apr. 29, 2002
(87) PCT Pub. No.: WO01/35521
PCT Pub. Date: May 17, 2001

(30) Foreign Application Priority Data

| Nov. 12, 1999 | (KR) | 1999-50263 |
| Jul. 1, 2000 | (KR) | 2000-37562 |
| Jul. 1, 2000 | (KR) | 2000/37563 |
| Jul. 1, 2000 | (KR) | 2000/37564 |
| Jul. 1, 2000 | (KR) | 2000/37565 |
| Jul. 1, 2000 | (KR) | 2000-37566 |
| Jul. 1, 2000 | (KR) | 2000-37570 |

(51) Int. Cl.$^7$ ............................................. H02P 7/00
(52) U.S. Cl. .................... 318/434; 318/254; 318/432; 318/439
(58) Field of Search ................. 318/439, 432, 318/778, 767, 766, 788, 780, 782, 787, 793, 783, 785, 434

(56) References Cited

U.S. PATENT DOCUMENTS 4,012,678 A * 3/1977 Blaha ....................... 318/794
4,084,202 A * 4/1978 Stoll ........................ 361/24

(List continued on next page.)

FOREIGN PATENT DOCUMENTS

| DE | 276956 A1 | 3/1990 |
| EP | 0031688 | 7/1981 |
| EP | 0935328 A2 | 8/1999 |
| JP | 10-160274 | 6/1998 |

*Primary Examiner*—Rina Duda
*Assistant Examiner*—Renata McCloud
(74) *Attorney, Agent, or Firm*—Birch, Stewart, Kolasch & Birch, LLP

(57) ABSTRACT

Device and method for controlling supply of current and static capacitance to a compressor, the device including a control signal generating part for providing control signals for controlling a current and a static capacitance to a main winding and a supplementary winding of the compressor, a current controlling part for limiting the current of the utility voltage to the main winding in the starting and supplying the current to the main winding regularly after the starting in response to the control signal, and a static capacitance controlling part for supplying both a starting static capacitance and an operative static capacitance to a supplementary winding in starting, and for supplying only the operative static capacitance after the starting, in response to the control signal.

60 Claims, 10 Drawing Sheets

U.S. PATENT DOCUMENTS

| | | | | |
|---|---|---|---|---|
| 4,107,583 A | * | 8/1978 | Houtman | 318/781 |
| 4,465,960 A | * | 8/1984 | Pfarrer | 318/774 |
| 4,465,962 A | * | 8/1984 | Kirschbaum | 318/817 |
| 5,103,154 A | | 4/1992 | Dropps et al. | |
| 5,162,718 A | * | 11/1992 | Schroeder | 318/794 |
| 5,300,871 A | * | 4/1994 | Bucher et al. | 318/794 |
| 5,345,126 A | * | 9/1994 | Bunch | 310/68 C |
| 5,451,853 A | * | 9/1995 | Itoh | 318/788 |
| 5,559,418 A | * | 9/1996 | Burkhart | 318/785 |
| 5,561,357 A | * | 10/1996 | Schroeder | 318/789 |
| 5,898,289 A | * | 4/1999 | Hamatani | 318/788 |
| 6,034,503 A | * | 3/2000 | Pertessis | 318/785 |
| 6,040,679 A | * | 3/2000 | Monk et al. | 318/778 |
| 6,122,154 A | * | 9/2000 | Damerow et al. | 361/32 |
| 6,249,104 B1 | * | 6/2001 | Janicek | 318/791 |
| 6,320,348 B1 | * | 11/2001 | Kadah | 318/785 |
| 6,342,994 B1 | * | 1/2002 | Cousy et al. | 361/24 |
| 6,407,530 B1 | * | 6/2002 | Kwon et al. | 318/778 |

* cited by examiner

DEVICE AND METHOD FOR CONTROLLING SUPPLY OF CURRENT AND STATIC CAPACITANCE TO COMPRESSOR

This application is the national phase under 35 U.S.C. §371 of PCT International Application No. PCT/KR00/01168 which has an International filing date of Oct. 18, 2000, which designated the United States of America.

TECHNICAL FIELD

The present invention relates to device and method for controlling supply of current and static capacitance to a compressor.

BACKGROUND ART

FIG. 1 illustrates a diagram showing a related art device for controlling supply of current and static capacitance to a compressor.

Referring to FIG. 1, a related art device for controlling supply of current and static capacitance to a compressor is provided with a utility power supply 1, a first relay 2 for being turned on/off in response to a control signal from the compressor, a reactor 3 for absorbing a reactive power from the utility power supplied through the utility power supply 1 according to the turning on/off operation of the first relay 2, and providing the utility power to a main winding C1 of a compressor motor 'M', a second relay 4 for monitoring a voltage on the reactor 3, a first contact 4a connected parallel to the third reactor 3 for being opened or closed by the second relay 4, an operating capacitor 5 connected in parallel to the third reactor 3, a starting capacitor 6 connected in parallel with the operating capacitor 5, a third relay 7 for monitoring a voltage at starting, a second contact 7a fitted to a fore end of the second relay 4 for being opened or closed by the third relay, and a third contact 7b fitted to a rear end of the starting capacitor.

The operation of the foregoing related art device will be explained.

Upon application of the control signal from the compressor, the first relay 2 is turned on, to supply a power to the main winding C1 of the compressor motor 'M' through the third reactor 3. In this instance, the third reactor 3 removes a reactive power from the power to the main winding. On the other hand, the utility power is supplied to a supplementary winding of the compressor motor 'M' through the parallel circuit of the operating capacitor 5 and the starting capacitor 6 as the third contact 7b is closed. Referring to a region 8 in FIG. 1, at an initial starting of the compressor, since the compressor motor 'M' is not rotated, a voltage to the third relay 7 is too low to put the third relay 7 into action. And, if the compressor motor 'M' becomes to rotate at a revolution higher than a preset value as the voltage on the third relay 7 rises according to the rotation of the compressor motor 'M', the third relay 7 comes into action, to close the second contact 7a and to open the third contact 7b. Since the second relay 4 comes into action as the second contact 7a is closed, the first contact 4a is closed to turn off the third reactor 3 and to open the third contact 7b, to isolate the starting capacitor from the circuit. That is, at the moment of starting, the third reactor 3 becomes to be connected to the compressor motor 'M' in series to limit an excessive current, and the starting capacitor 6 provides a greater capacitance to the supplementary winding C2 to improve starting characteristics of the compressor.

However, the related art device for controlling supply of power to a compressor has the following disadvantages.

First, the re have been frequent troubles in the region 8 at which a starting capacitance is controlled.

Second, the mechanical system of the device for supplying power to the compressor costs high.

Third, the starting control by the voltage rise following rotation of the compressor motor 'M' can not define a starting current accurately and has a poor starting characteristic.

Fourth, the generation of excessive current in starting of the compressor actuates the circuit breaker, gives bad influences to peripheral device of the compressor, and has inconvenience in restoring the compressor to an original state.

DISCLOSURE OF INVENTION

Accordingly, the present invention is directed to device and method for controlling supply of current and static capacitance to a compressor that substantially obviates one or more of the problems due to limitations and disadvantages of the related art An object of the present invention is to provide device and method for controlling supply of current and static capacitance to a compressor, which can prevent flow of excessive current to a main winding of the compressor.

Other object of the present invention is to provide device and method for controlling supply of current and static capacitance to a compressor, which can supply a stable voltage to the compressor regardless of variation of an external utility voltage.

Another object of the present invention is to provide device and method for controlling supply of current and static capacitance to a compressor, which can prevent internal contacts suffer from damage caused by sharp current concentration during starting and operation of the compressor.

Further object of the present invention is to provide device and method for controlling supply of current and static capacitance to a compressor, which can make stable supply of current and static capacitance to the compressor to be consistent to an external temperature and season.

Still further object of the present invention is to provide device and method for controlling supply of current and static capacitance to a compressor, which can improve starting characteristics of the compressor of comparatively large capacity.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve the se and other advantages and in accordance with the purpose of the present invention, as embodied and broadly described, the device and method includes a controlling signal generating part for sensing a state of a utility voltage, i.e., a size and frequency of the utility voltage at first. Then, the controlling signal generating part classifies an operation time period into a starting time period and a time period after the starting time period, and generates a phase control signal for controlling a current to a main winding of the compressor to be different according to a result of comparison that the utility voltage being higher or lower than a preset value in starting. And, the control signal generating part provides a switching control signal for changing an internal circuit of the device in order to control a size of the utility voltage provided to the main winding and the stating supplementary winding of the compressor different in the starting and after the starting. And, the control signal generating part can generate the switching control signal and the phase control signal appropriately varying with an external temperature state of the compressors, seasons, and a present state of current supplied to compressor motors. The control signal generating part controls supply of the current of the utility voltage by controlling a phase thereof. The present invention suggests to use a triac or a negative temperature coefficient resister for controlling the phase of the current.

In the meantime, a current controlling part controls the phase of the current of the utility voltage in response to the phase control signal and changes an internal circuit in response to the switching control signal, for limiting the current of the utility voltage in supplying the current to the main windings in starting of the compressors, and supplying the current of the utility voltage to the main windings regularly after the starting.

In the meantime, a static capacitance controlling part changes an internal circuit in response to the switching control signal for supplying a starting static capacitance of the current from the current controlling part and an operating static capacitance of the current of the utility voltage to the supplementary winding in starting for starting the compressor effectively, and the operating static capacitance of the current of the utility voltage to the supplementary winding after the starting. The current controlling part and the static capacitance controlling part have switches respectively for varying the internal circuits in response to the control signals, and the control signal generating part generates the switching control signal different before and after the starting, in response to which the switches are operative in opposite directions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Figure 1:
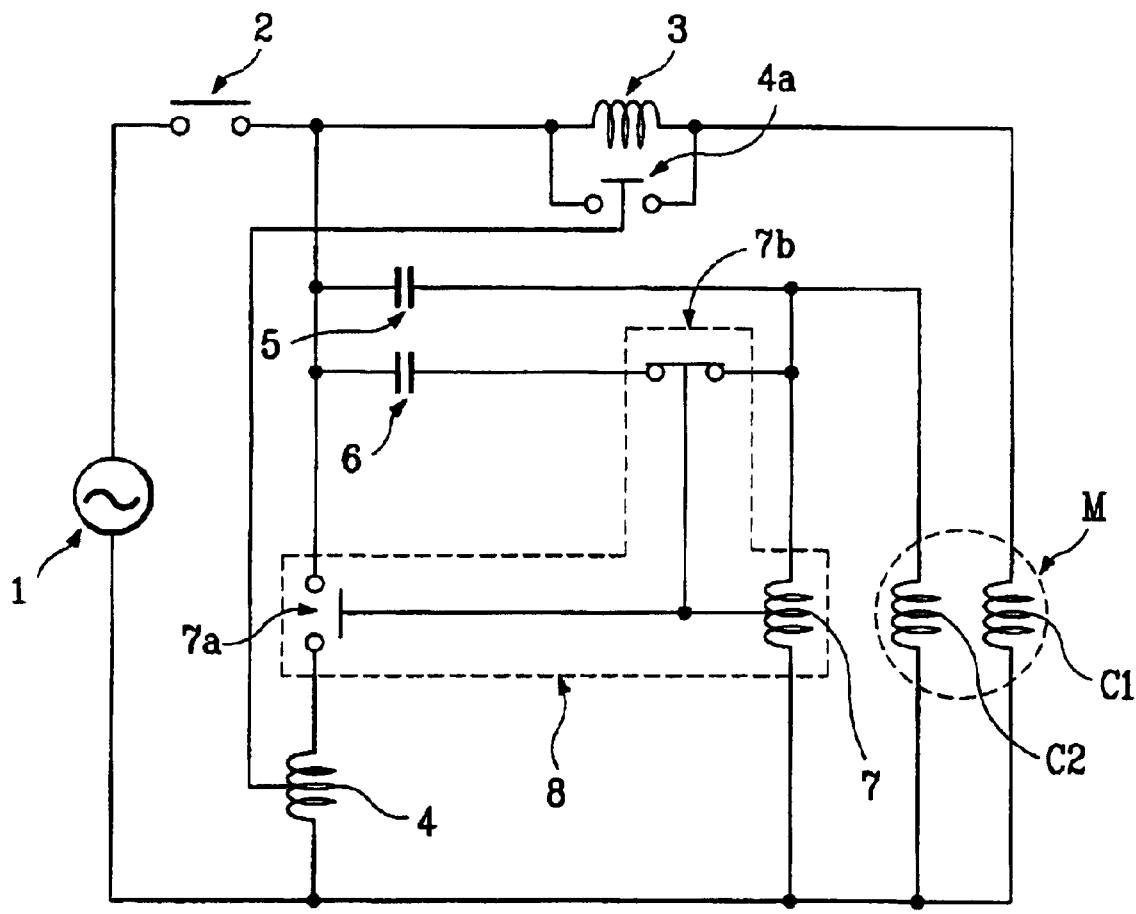
FIG. 1 illustrates a diagram showing a related art device for controlling supply of current and static capacitance to a compressor.
Figure 2:
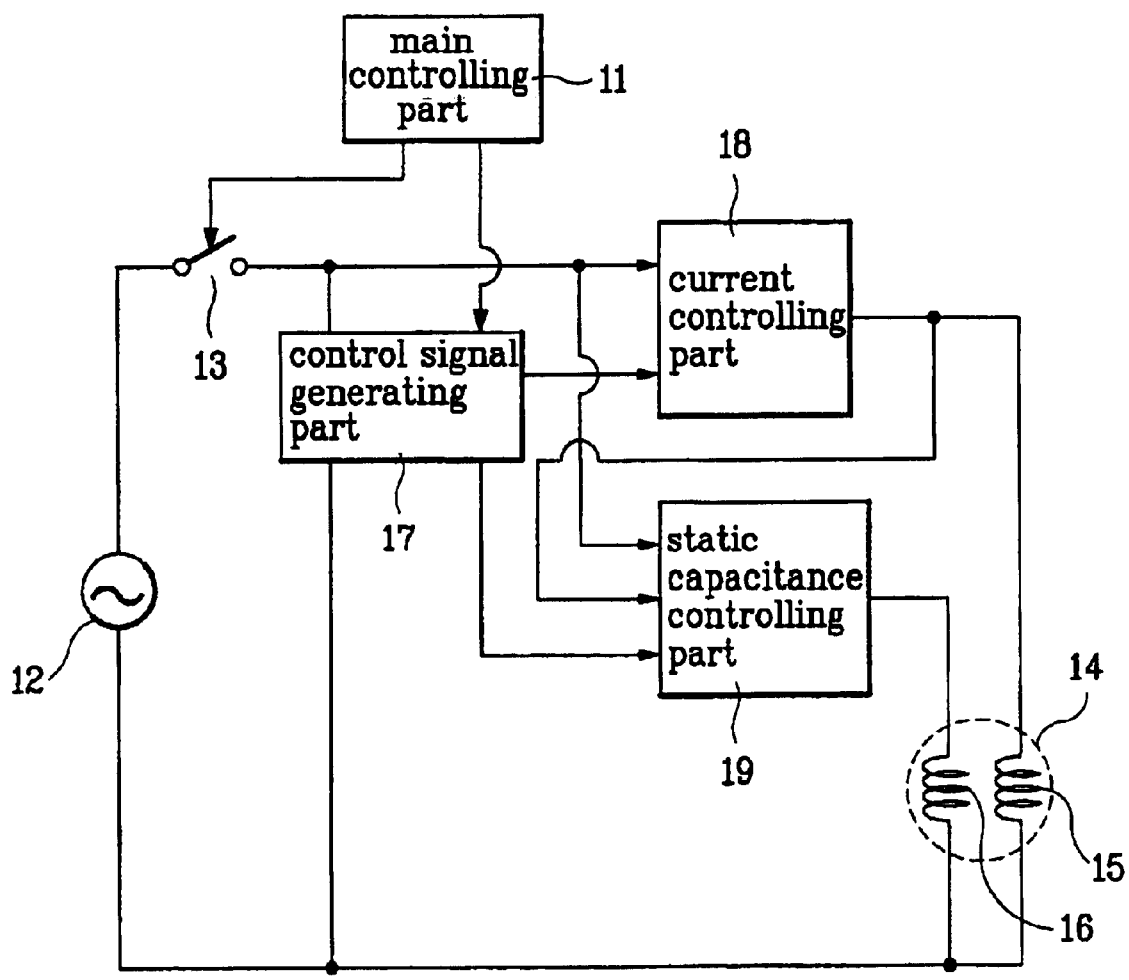
FIG. 2 illustrates a diagram showing concept of a device for controlling supply of current and static capacitance to a compressor of the present invention.

Reference will now be made in detail to the preferred embodiments of the present invention, examples of which are illustrated in the accompanying drawings. FIG. 2 illustrates a diagram showing concept of a device for controlling supply of current and static capacitance to a compressor of the present invention.

Referring to FIG. 2, the device for controlling supply of current and static capacitance to a compressor of the present invention includes a first controlling part 11 for controlling overall operation of the compressor, a utility voltage supply 12 for providing a utility voltage, a switch 13 operative in response to the turn on signal of the compressor from the first controlling part 11, a control signal generating part 17 for providing a control signal for controlling the utility voltage supply 12 to a main winding 15 and a supplementary winding 16 of the compressor 14 to vary with a state of the utility power supply, and different before and after the starting, a current controlling part 18 for limiting a current of the utility power supplied to the main winding during starting in response to the control signal and releasing the limiting of the current supplied to the main winding after the starting, and a static capacitance controlling part 19 for supplying a starting static capacitance from a current from the current controlling part 18 and an operative static capacitance from a current of the utility voltage to the supplementary winding during starting, and supplying the operative static capacitance after the starting, in response to the control signal.

Figure 3:
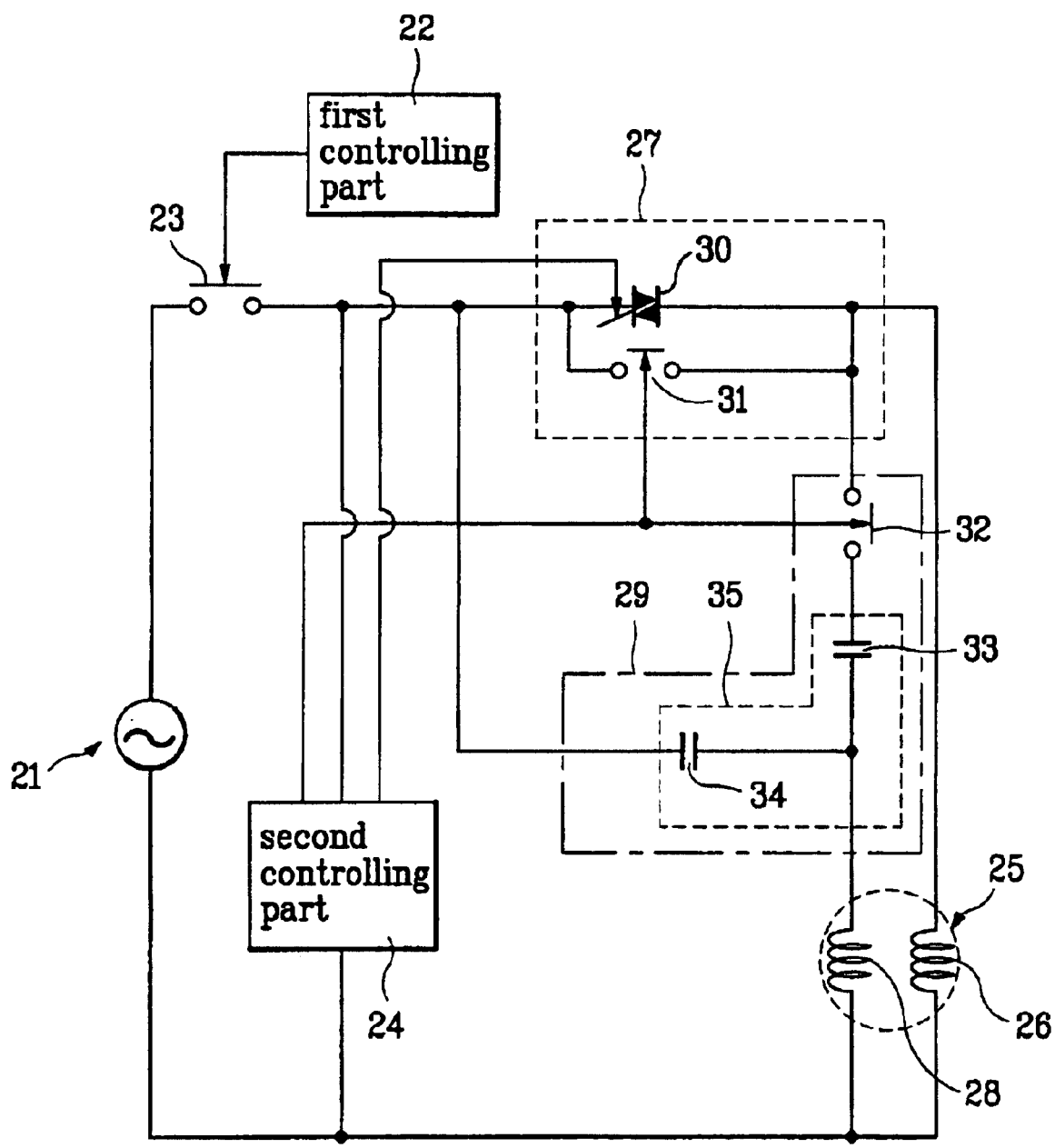
FIG. 3 illustrates a diagram showing a device for controlling supply of current and static capacitance to a compressor in accordance with a first preferred embodiment of the present invention.

FIG. 3 illustrates a diagram showing a device for controlling supply of current and static capacitance to a compressor in accordance with a first preferred embodiment of the present invention.

Referring to FIG. 3, the device for controlling supply of current and static capacitance to a compressor in accordance with a first preferred embodiment of the present invention includes a utility voltage supply 21 for supplying a utility voltage, a first controlling part 22 for controlling overall operation of the compressor, and providing a driving on/off signal for the compressor 25 according to a user's selection, a first switch 23 for being switched in response to the driving turn on/off signal for the compressor for supplying a current of the utility voltage to the compressor 25, a second controlling part 24 for providing a phase control signal and a switching control signal to vary with a state(a size and a frequency) of the utility power supply, and different before and after the starting, a current controlling part 27 for limiting the current in supplying the current to the main winding 26 of the compressor 25 during starting and releasing the limiting of the current after the starting to supply a regular sized current of the utility voltage by changing an internal circuit changeable in response to the switching controlling signal and controlling a phase of the current of the utility power in response to the phase control signal, and a static capacitance controlling part 29 having an internal circuit changeable in response to the switching control signal for supplying a starting static capacitance from the current from the current controlling part 27 and the operative static capacitance from a current of the utility power to the supplementary winding 28 of the compressor 25 during starting, and supplying only the operative static capacitance to the supplementary winding 28 of the compressor 25 after the starting in response to the switching control signal. The current controlling part 27 supplies current to the main winding 26 in a direction the current is increased gradually between an initial starting point to a starting completion point in response to the phase control signal and the switching control signal. And, the current controlling part 27 includes a second switch 31 for switching on/off between an output contact point of the first switch 23 and the main winding 26 in response to the switching control signal, and a phase controlling part 30 connected in parallel to the second switch 31 between an input contact point and an output contact point of the second switch 31 for controlling a phase of the current supplied to the main winding 26 depending on the switching on/off state of the second switch 31 and the phase control signal. The static capacitance controlling part 29 includes a third switch 32 having an input contact point connected both to an output terminal of the phase controlling part 30 and an output contact point of the second switch 31 for switching on/off opposite to the second switch 31 in response to the switching control signal, and a static capacitance generating part 35 having a first input terminal connected to an output contact point of the third switch 32, a second input terminal connected to an output contact point of the first switch 23, and an output terminal connected between the supplementary winding for providing a required static capacitance to the supplementary winding 28 depending on switching on/off state of the third switch 32.

In the meantime, in response to the switching control signal, the second switch 31 is operative such that the output contact point of the first switch 23 and the main winding 26 are connected through the phase controlling part 30 in starting, and the output contact point of the first switch 23 and the main winding 26 are connected directly after the starting. In starting, the third switch 32 is switched in response to the switching control signal, to connect both an output terminal of the phase controlling part 30 and an output contact point of the first switch 23 to the supplementary winding 28 through the static capacitance generating part 35 so that the static capacitance generating part 35 has the starting static capacitance and the operating static capacitance for the starting. Opposite to this, after the starting, the third switch 32 is switched, to connect the output contact point of the first switch 23 to the supplementary winding 28 through the static capacitance generating part 35 so that the static capacitance generating part 35 generates only the operating static capacitance relatively small compared to the case of the starting. The phase controlling part 30 in the current controlling part 27 is a triac to be driven in response to the phase control signal for controlling a phase of the current to be supplied to the main winding 26. The static capacitance generating part 35 in the static capacitance controlling part 29 includes a starting capacitor 33 connected between an output contact point of the third switch 32 and the supplementary winding 28, and operating capacitor 34 connected between an output contact point of the first switch 23 and the supplementary winding 28 in parallel to the starting capacitor 33. That is, in response to the switching control signal, the second switch 31 changes an internal circuit of the current controlling part 27 such that an output contact point of the first switch 23 is connected to the main winding 26 through the phase controlling part 35 in starting, and the output contact point of the first switch 23 is connected to the main winding directly after the starting. And, in response to the switching control signal, the third switch 32 changes an internal circuit of the static capacitance controlling part 29, so that the static capacitance generating part 35 provides a great static capacitance for the starting in starting, and relatively small operating static capacitance after the starting. As explained, upon reception of the phase control signal from the second controlling part 24 as a gate voltage, the triac 30, as the phase controlling part, controls the phase of the current of the utility voltage. In general, the gate voltage is provided in a pulse form, and has a great duty ratio when the utility voltage is lower than a reference value and a small duty ratio when the utility voltage is higher than the reference value. In the meantime, the starting capacitor 33 and the operating capacitor 34 are connected in parallel to each other during starting for providing a starting torque capacitance by the switching of the third switch 32, but only the operating capacitor 34 is used after the starting.

Figure 4:
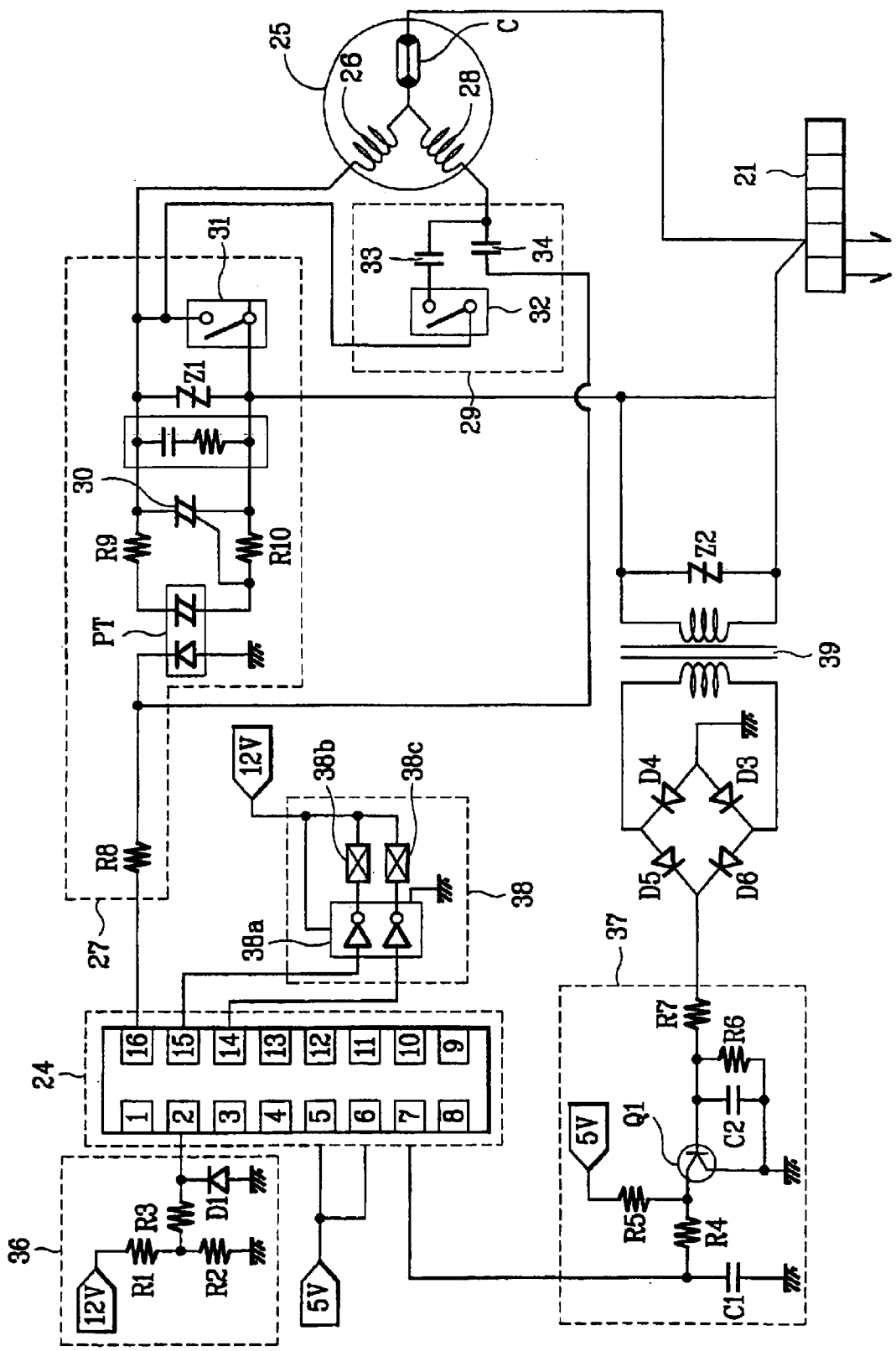
FIG. 4 illustrates a detailed circuit of the device shown in FIG. 3.

FIG. 4 illustrates a detailed circuit of the device shown in FIG. 3.

Referring to FIG. 4, the transformer 39 obtains a voltage of desired size from the utility voltage supply 21. A voltage sensing part 36 senses a size of the voltage of the provided utility power and provides to the second controlling part 24. A frequency sensing part 37 senses a frequency of the utility voltage from the voltage provided from the transformer, and provides to the second controlling part 24. The second controlling part 24 generates control signals, i.e., the switching control signal and the phase control signal, to vary with the size and the frequency of the utility voltage sensed through the voltage sensing part 36 and the frequency sensing part 37, and provides the control signals to the current controlling part 27 and the static capacitance controlling part 29. Eventually, during the compressor 25 is started, the starting supplementary winding 28 is provided with the starting static capacitance from the current from the current controlling part 27 and the operating static capacitance from the current of the utility voltage, and the main winding 26 is provided with the limited current of the utility voltage. In the meantime, even if the size of the utility voltage is changed, to change the phase control signal from the second controlling part 24 too, the current to the main winding 26 is constant as the triac 30 in the current controlling part 27 is driven in response to the changed phase control signal. By the way, after the compressor 25 is started, the starting supplementary winding 28 is provided with the operating static capacitance from the current of the utility voltage, and the main winding 26 is provided with the current of the utility voltage as it is. Identical to the starting, if the re is a change of the utility voltage, the second controlling part 24 provides the phase control signal to the triac 30 in the current controlling part 27, for varying the current to the main winding 26 with the utility voltage. In FIG. 4, unexplained reference symbols R1–R10 denote resistors, C1–C6 denote capacitors, D1–D6 denote diodes, Z1–Z2 denotes Zener diodes, and PT denotes a photo transistor which provides a driving voltage to the gate of the triac.

The operation of the first embodiment device for controlling supply of current and static capacitance to a compressor of the present invention will be explained with reference to FIG. 3.

Upon reception of the voltage of the utility voltage supply 21 (a utility voltage), the transformer 39 provides internal voltages required for the control device from the utility voltage. Then, the second controlling part(a microcomputer) 24 in the control device is initialized, such that the voltage sensing part 36 provides a size of the sensed utility voltage to the second controlling part 24. The frequency sensing part 37 senses a frequency of the utility voltage, and provides to the second controlling part 24. The second controlling part 24 determines a state of the utility voltage by using the size and the frequency of the utility voltage. Then, the second controlling part 24 generates control signals, i.e., the phase control signal and the switching control signal to be provided to the current controlling part 27 and the static capacitance controlling part 29 according to the determined state of the utility voltage. A starting time is determined, in which the utility voltage is provided to the starting capacitor 33 of the static capacitance controlling part 29, and the switching control signal is generated, and provided to the second switch 31 and the third switch 32. According to the switching control signal, the third switch 32 is turned on and the second switch 31 is turned off in the starting. And, the second controlling part 24 provides the phase control signal for controlling the phase of the current of the utility voltage supplied to the main winding 26. With the phase control signal, the triac 30 is driven, and the current provided to the main winding 26 is varied. As explained, the phase control signal is a rectangular signal provided to the gate of the triac 30, a duty ratio thereof is fixed based on a voltage provided from the voltage sensing part 36, and an output time point thereof is fixed based on the frequency value provided from the frequency sensing part 37. The supplementary winding 28 of the compressor 25 is required to be provided with a great static capacitance for improving starting characteristics. Accordingly, the operating capacitor 34 and the starting capacitor 33 are connected in parallel by the operation of the third switch 32, to provide starting static capacitances and operating static capacitances to the supplementary winding 28 during starting respectively. In this instance, the starting capacitor 33 is provided with the current from the current controlling part 27 through the third switch 32, and the operating capacitor 34 is provided with the current of the utility voltage.

In the meantime, once the starting is completed, only the operating static capacitance from the operating capacitor 34 is provided to the supplementary winding 28 as the third switch 32 is turned off(or opened) during operation of the compressor 25. As explained, the phase control signal and the switching control signal for the compressor 25 are dependent on the state of the utility voltage. That is, if the utility voltage is lower than preset overvoltages, turn on time periods of the triac 30 and the third switch 32 are set longer, to make the compressor started at a lower voltage. Opposite to this, if the utility voltage is higher than preset overvoltages, turn on time periods of the triac 30 and the third switch 32 are set shorter, for preventing flow of an excessive current to the supplementary winding 26. The phase control signal is started to be supplied to the triac 30 in response to a frequency signal sensed through the frequency sensing part 37. That is, starting from a time point a signal form the frequency sensing part 37 rises from '0'V to '5V', a timer(not shown) in the second controlling part 24 is driven, and the triac 30 comes into operation in response to the phase control signal of a rectangular form fixed according to the state of the utility voltage. In the meantime, as the phase control signal, a voltage is provided to a gate of the triac 30 such that a fixed current of a limited size flows to the main winding 26 in an initial starting time period, a gradually increasing current flows to the main winding 26 in a middle starting time period, and a current of second size (>first size) flows to the main winding 26 in a final starting time period. As explained, provided that starting of the compressor is finished as the third switch 32 is turned on and the triac 30 is operated for a certain time period, the third switch 32 is turned off to leave open, to cut off the current supplied to the starting capacitor 33. Accordingly, after the starting of the compressor 25, the operating static capacitance is supplied to the supplementary winding 28 only through the operating capacitor 34. When a time period is passed after the third switch 32 is turned off, the second switch 31 is turned on, to lead the current of the utility voltage to the main winding 26 through the turned on second switch 31 instead of the triac 30. In this instance, for stable operation of the control device, the triac 30 is kept turned on for a time period even after the third switch 32 is turned off and the second switch 31 is turned on. Thereafter, the current is provided to the main winding 26 only through the turned on second switch 31. Accordingly, the current of this time is not the limited size in the starting, but a normal size of the utility voltage. On the other hand, if the first switch 23 is turned off to leave open in response to a compressor driving control signal from the first controlling part 22, as a main controlling part shown in FIG. 3, the utility voltage is supplied to the compressor 25 no more, to stop operation of the compressor 25.

As explained, the first embodiment device for controlling supply of current and static capacitance to a compressor of the present invention has the following advantages.

The starting time and a size of the phase control signal are controlled according to a state of the utility voltage. And, in starting, the supplementary winding is provided with a static capacitance from a current from the current controlling part and an operating static capacitance from a current of the utility voltage. Therefore, the device of the present invention is favorable for starting a large capacity compressor. And, the triac is used for controlling the phase, and a gate driving signal for the triac has a value gradually increased from a fixed voltage of a limited size during the starting. Accordingly, flow of an excessive current to the main winding can be prevented during starting of the compressor, to permit a significant improvement of starting characteristics of the compressor. And, the cutting off of the supply of unnecessary current to the compressor permits to prevent giving bad influence to the peripheral devices.

Figure 5:
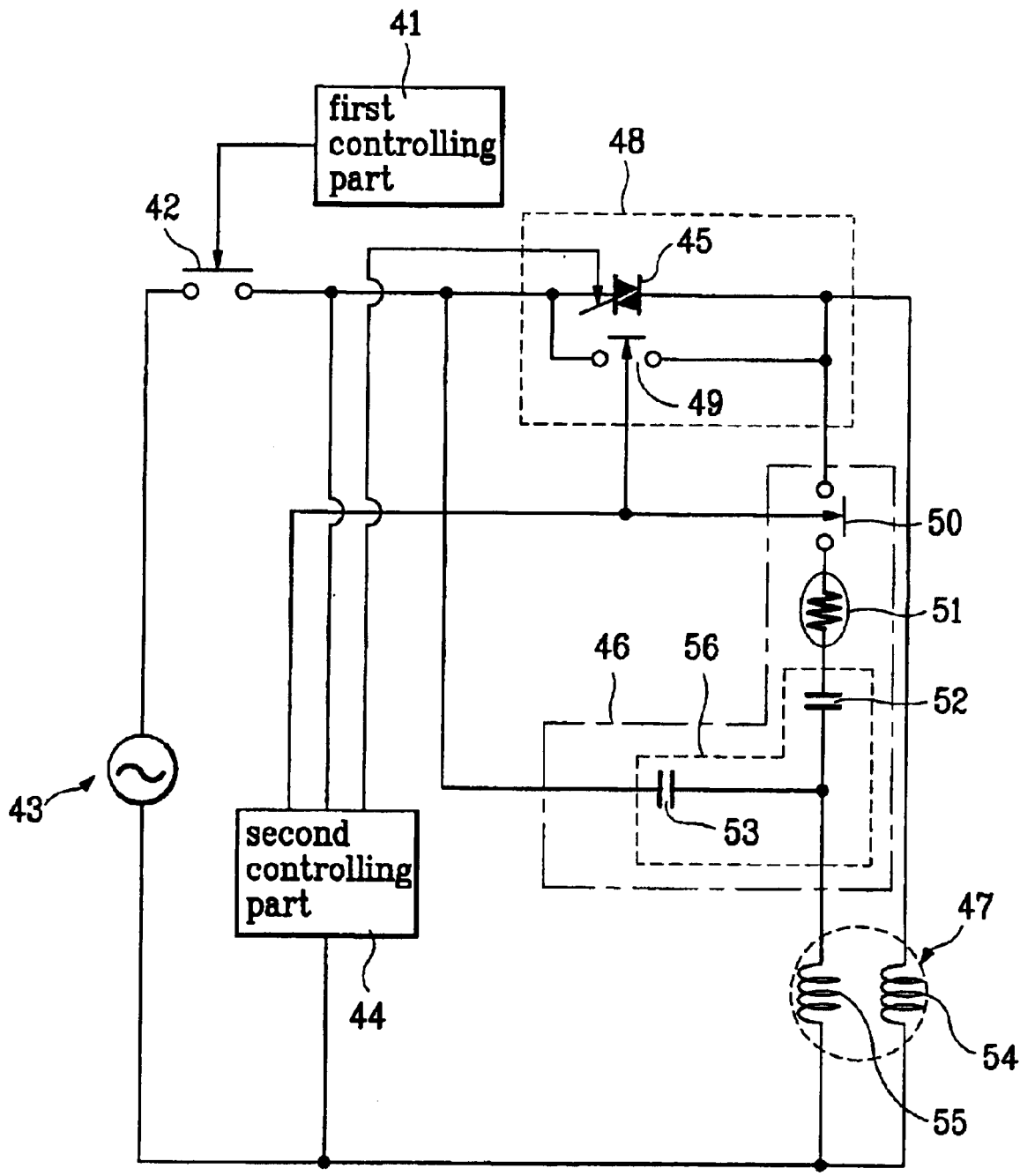
FIG. 5 illustrates a diagram showing a device for controlling supply of current and static capacitance to a compressor in accordance with a second preferred embodiment of the present invention.

FIG. 5 illustrates a diagram showing a device for controlling supply of current and static capacitance to a compressor in accordance with a second preferred embodiment of the present invention.

Referring to FIG. 5, the second embodiment device of the present invention includes a first controlling part 45 for controlling overall operation of the compressor 47, and providing a turning on/off signal for the compressor 47 according to a user's selection, a first switch 42 for supplying a utility voltage or cutting off the supplying of the utility voltage from a utility voltage supply 43 to the compressor in response to the turning on/off signal for the compressor, a second controlling part 44 connected to an output contact point of the first switch 42 for sensing a size and frequency of the utility voltage, and providing a phase control signal for controlling a phase of a current of the utility voltage according to the sensed voltage and frequency and a switching control signal different before and after the starting, a current controlling part 45 having an internal circuit changeable in response to the switching control signal for limiting the current of the utility voltage in supplying the current to the main winding 54 of the compressor 47 during staring and releasing the limiting of the current after the starting, and a static capacitance controlling part 46 having a function for preventing a surge current caused by internal momentary discharge and an internal circuit changeable in response to the switching control signal for supplying a starting static capacitance from the current from the current controlling part 45 and an operative static capacitance from the utility voltage during starting, and only the operative static capacitance from the utility voltage, to the supplementary winding 55 of the compressor 47 after the starting. The current controlling part 45 shown in FIG. 6 supplies a current to the main winding 54 in a direction the current is increased gradually from an initial starting point to a starting completion point in response to the switching control signal and the phase control signal. The current controlling part 45 includes a second switch 49 for switching on/off between an output contact point of the first switch 42 and the main winding 54 in response to the switching control signal, and a triac 45 connected to the second switch 42 between an input contact point and an output contact point thereof in parallel for controlling a phase of the current supplied to the main winding 54 depending on the switching on/off state of the second switch 49 and the phase control signal. The static capacitance controlling part 46 includes a third switch 50 having an input contact point connected both to an output terminal of the phase controlling part 48 and an output contact point of the second switch 49 for switching on/off opposite to the second switch 49 in response to the switching control signal, a negative temperature coefficient resister 51 having an input terminal connected to an output terminal of the third switch 50, and a static capacitance generating part 56 having a first input terminal connected to an output terminal of the negative temperature coefficient resister 51, a second input terminal connected to an output contact point of the first switch 42, and an output terminal connected to the supplementary winding 55 for providing a required static capacitance to the supplementary winding 55 depending on switching on/off states of the second switch 49 and the third switch 50.

Figure 6:
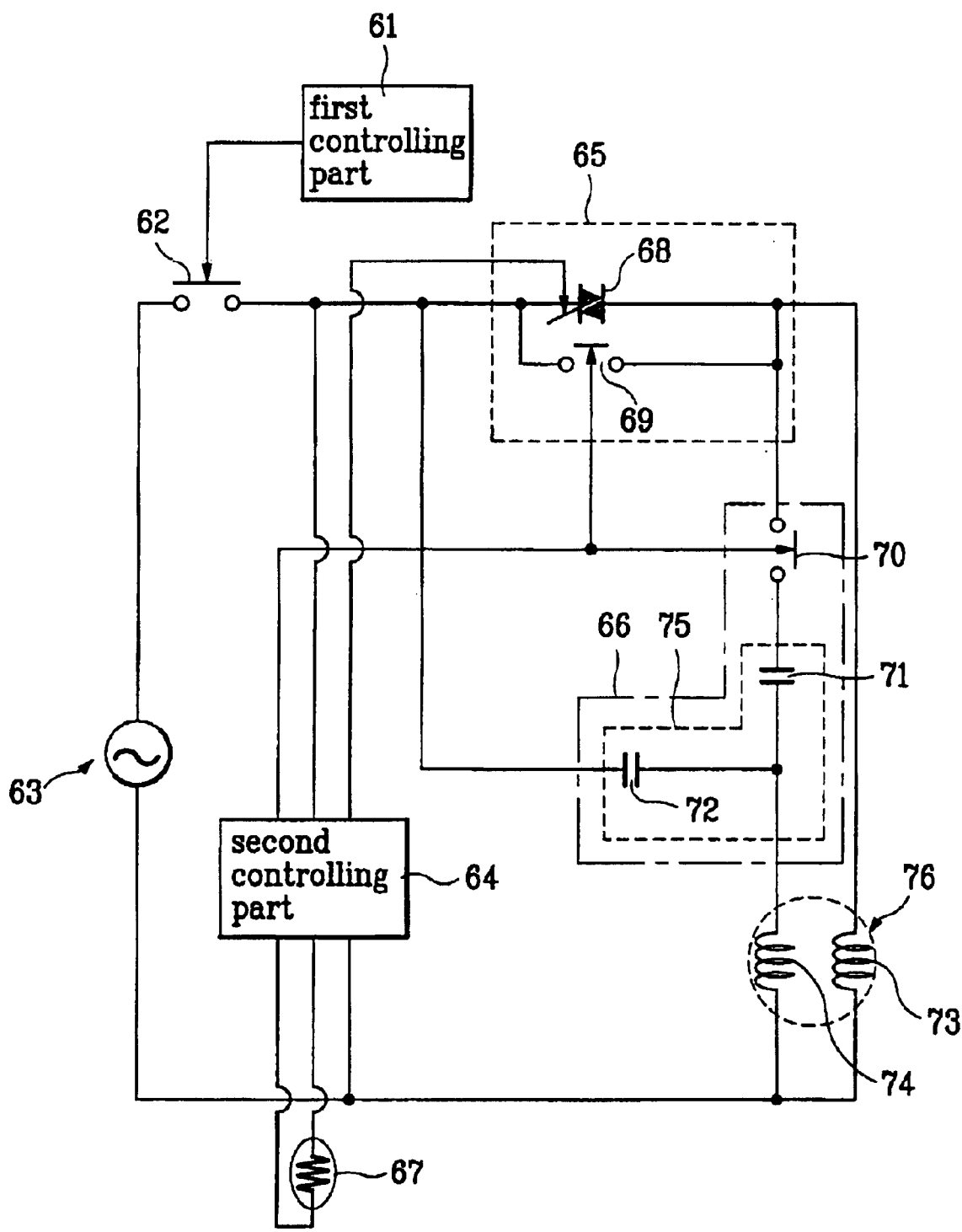
FIG. 6 illustrates a diagram showing a device for controlling supply of current and static capacitance to a compressor in accordance with a third preferred embodiment of the present invention.

In response to the switching control signal, the second switch 49 connects the output contact point of the first switch 42 and the main winding 54 through the phase controlling part 48 in starting, and the second switch 49 connects the output contact point of the first switch 42 and the main winding 54 directly after the starting. The third switch 50 is switched in response to the switching control signal, to connect an output terminal of the phase controlling part 48 to the supplementary winding 55 through the static capacitance generating part 56 together with an output contact point of the first switch 42 so that the static capacitance generating part 56 has a great static capacitance in starting, and to connect only the output contact point of the first switch 42 to the supplementary winding 55 through the static capacitance generating part 56 so that the static capacitance generating part 56 generates a relatively small static capacitance after the starting. The phase controlling part 48 in the current controlling part 45 is a triac driven by the phase control signal for controlling a phase of the current supplied to the main winding 54. Hereafter, the phase controlling part will be a triac 48. The static capacitance generating part 56 in the static capacitance controlling part 46 includes a starting capacitor 52 connected between an output terminal of the negative temperature coefficient resister 51 and the supplementary winding 55, and an operation capacitor 53 connected between an output contact point of the first switch 42 and the supplementary winding 55 in parallel with the first capacitor 52. The negative temperature coefficient resister 51 is provided between the third switch 50 and the starting capacitor 52 for preventing a surge current to the third switch 50 caused by momentary discharge between the starting capacitor 52 and the operating capacitor 53 at an initial starting, thereby preventing seizure of the third switch 50. As shown in FIG. 6, the static capacitance generating part 56 includes an operating capacitor 49 connected between an output contact point of the third switch 47 and the supplementary winding 53 for keeping to provide a fixed static capacitance to the supplementary winding 53 in starting and after the starting, and a starting capacitor 48 connected between the negative temperature coefficient resister 50 and the supplementary winding 53 in series and connected with the operation capacitor 49 in parallel for providing the starting static capacitance to boost a starting torque in starting.

The operation of the second embodiment device for controlling supply of current and static capacitance to a compressor of the present invention will be explained with reference to FIG. 5.

Upon reception of the voltage from the utility voltage supply 43, the second controlling part(a microcomputer) 46 in the control device is initialized, and monitors a state of the utility voltage, i.e., a size and frequency. The second controlling part 46 determines the state of the utility voltage with reference to the sensed voltage and frequency. Then, the second controlling part 46 generates a phase control signal and a switching control signal for providing to the current controlling part 45 and the static capacitance controlling part 46 according to the determined state of the utility voltage. That is, a starting time at which the utility voltage is provided to the starting capacitor 52 of the static capacitance controlling part 46 is determined, and the switching control signal is generated, and provided to the second switch 49 and the third switch 50. According to the switching control signal, the third switch 50 is turned on and the second switch 49 is turned off. And, the second controlling part 46 provides the phase control signal for controlling the phase of the utility voltage supplied to the main winding 54 of the compressor 47. With the phase control signal, the triac 48 is driven, and the current provided to the main winding 54 is varied. As explained, the phase control signal is a rectangular signal provided to the gate of the triac 48, a duty ratio thereof is fixed based on a state of a sensed utility voltage, and an output time point thereof is fixed based on the frequency of the sensed utility voltage. The supplementary winding 55 of the compressor 47 is required to be provided with a great static capacitance for improving starting characteristics. Accordingly, the operating capacitor 53 and the starting capacitor 52 are connected in parallel by the operation of the third switch 50, to provide a starting static capacitance and an operating static capacitance to the supplementary winding 55 during starting. In this instance, the starting capacitor 52 is provided with the current from the current controlling part 45 through the third switch 50, and the operation capacitor 53 is provided with a current of the utility voltage.

In the meantime, once the starting is completed, only the operation capacitance from the operating capacitor 53 is provided to the supplementary winding 55 as the third switch 50 is turned off(or opened) during operation of the compressor 47. As explained, the phase control signal and the switching control signal for the compressor 47 are dependent on the state of the utility voltage(size and frequency). That is, if the utility voltage is lower than preset reference voltage, a turn on time period of the triac 48 and the third switch 50 is set longer, to make the compressor started well even at a lower voltage. And, if the utility voltage is higher than preset reference voltage, a turn on time periods of the triac 48 and the third switch 50 is set shorter, for preventing flow of an excessive current to the main winding 54. In the meantime, during a few seconds before the triac 48 is turned on, charges both in the operation capacitor 53 and in the starting capacitor 52 are liable to flow to the supplementary winding 55 in a surge current. In this instance, at the moment the third switch 50 is turned on for using the starting capacitor 52, the surge current may occur owing to a momentary discharge. However, the negative temperature coefficient resister 51 provided between the starting capacitor 52 and the operation capacitor 53 can prevent the seizure of the third switch 50 caused by the surge current. That is, according to its characteristics, the negative temperature coefficient resister 51 has a resistance which becomes the smaller as it is heated up the higher. A great initial resistance permits to prevent the third switch 50 from being broken by the surge current. In the meantime, as explained, the phase control signal is started to be supplied to the triac 48 in response to a sensed frequency signal. That is, starting from a time point the frequency signal rises from '0'V to '5V', a timer in the second controlling part 46 comes into operation, and the triac 30 comes into operation using the phase control signal of a rectangular form fixed according to the state of the utility voltage as a driving signal. That is, as a driving signal of the triac 48, a fixed voltage is provided to the gate of the triac 48 such that a limited first size current flows to the main winding 54 in an initial time period of starting, a gradually rising voltage is provided to the gate of the triac 48 such that a gradually increasing current flows to the main winding 54 in a middle time period of starting, and a voltage of a second size(>first size) is provided to the gate of the triac 48 such that a second size current flows to the main winding 54 in a final time period of starting. As explained, if the third switch 50 is turned on and the triac 48 comes into operation, to make the compressor 25 started, the third switch 50 is turned off to leave open after a preset time period, to cut off the current supplied to the supplementary winding 55 through the starting capacitor 52. Accordingly, during operation of the compressor 47, only the operating static capacitance is supplied to the supplementary winding 55 through the operating capacitor 53. When a preset time period is passed after the third switch 50 is turned off, the second switch 49 is turned on, to lead the current of the utility voltage to the main winding 54 through the turned on second switch 49 instead of the triac 48. In this instance, for stable operation of the control device, the triac 48 is kept turned on for a preset time period even after the third switch 50 is turned off and the second switch 49 is turned on. After a preset time point, the current is provided to the main winding 54 only through the turned on second switch 49. Accordingly, the current of this time has not a limited size in the starting, but a normal size of the utility voltage. On the other hand, if the first switch 42 is turned off to leave open in response to a compressor driving turn off signal from the first controlling part 45, as a main controlling part shown in FIG. 5, the utility voltage is supplied to the compressor 47 no more, to stop operation of the compressor 47.

As explained, the second embodiment device for controlling supply of current and static capacitance to a compressor of the present invention has the following advantages.

The negative temperature coefficient resister having a resistor with a great initial resistance which becomes the smaller as it is heated the higher is provided between the starting capacitor and the operation capacitor, which is involved in a decreased resistance when it is heated. Accordingly, in an initial starting, occurrence of the surge current between the starting capacitor and the operation supporting capacitor is prevented at the moment the triac is turned on, thereby preventing seizure of closely disposed contact points in the switches, or breakage of the starting capacitor. As the static capacitance controlling part is provided with the current of the utility voltage as well as the current from the current controlling part, a great static capacitance is generated. Accordingly, the second embodiment device is favorable to a large capacity compressor.

FIG. 6 illustrates a diagram showing a device for controlling supply of current and static capacitance to a compressor in accordance with a third preferred embodiment of the present invention.

Referring to FIG. 6, the device for controlling supply of current and static capacitance to a compressor in accordance with a fourth preferred embodiment of the present invention includes a first controlling part 61 for providing a driving turn on/off signal for the compressor 76 according to a user's selection, a first switch 62 for supplying the utility voltage or cutting off the supplying of the utility voltage to the compressor 76 in response to the driving turn on/off signal, a temperature sensing part 67 for sensing an external temperature of the compressor 76 and providing the sensed temperature, a second controlling part 64 for providing a phase control signal and a switching control signal of the utility voltage different before and after the starting and depending on a size and frequency of the utility voltage and the external temperature value, a current controlling part 65 having an internal circuit changeable in response to the switching control signal and the phase control signal for limiting the current of the utility voltage in supplying the current to the main winding 73 of the compressor 76 during starting and supplying the current of the utility voltage after the starting, and a static capacitance controlling part 66 having an internal circuit changeable in response to the switching control signal for supplying a starting static capacitance of a current from the current controlling part 65 and an operative static capacitance of a current of the utility voltage to the supplementary winding 74 of the compressor 76 during starting, and supplying only the operative static capacitance of the current of the utility voltage to the supplementary winding 74 of the compressor 76 after the starting. In FIG. 6, the current controlling part 65 includes a second switch 69 for switching on/off between an output contact point of the first switch 62 and the main winding 73 in response to the switching control signal, and a phase controlling part 68 connected to the second switch 69 between an input contact point and an output contact point thereof in parallel for controlling a phase of the current supplied to the main winding 73 depending on a switching on/off state of the second switch 69 and the phase control signal. As shown in FIG. 6, the static capacitance controlling part 66 includes a third switch 70 having an input contact point connected to an output terminal of the phase controlling part and an output contact point of the second switch 69 for switching on/off opposite to the second switch 69 in response to the switching control signal, and a static capacitance generating part 75 having a first input terminal connected to an output contact point of the second switch 69, a second input terminal connected to an output contact point of the first switch 62, and an output terminal connected to the supplementary winding 74 for providing a required static capacitance to the supplementary winding 74 depending on a switching on/off state of the third switch 70.

In the meantime, in response to the switching control signal, the second switch 69 connects the output contact point of the first switch 62 and the main winding 73 through the phase controlling part 68 in starting, and connects the output contact point of the first switch 62 and the main winding 73 directly after the starting. The third switch 70 is switched in response to the switching control signal, to connect both an output terminal of the phase controlling part 68 and an output contact point of the first switch 62 to the supplementary winding 74 through the static capacitance generating part 75 so that the static capacitance generating part 75 has a starting static capacitance and an operation static capacitance in starting, and to connect only the output contact point of the first switch 62 to the supplementary winding 74 through the static capacitance generating part 75 so that the static capacitance generating part 75 generates only the operation static capacitance after the starting. In the current controlling part 65, the phase controlling part 68 is a triac to be driven by the phase control signal for controlling a phase of a current supplied to the main winding 73, and will be called as triac 68, hereafter. The static capacitance generating part 75 includes a starting capacitor 71 connected between an output contact point of the third switch 70 and the supplementary winding 74, and operation capacitor 72 connected between an output contact point of the first switch 62 and the supplementary winding 74 and connected in parallel to the starting capacitor 71.

The operation of the third embodiment device for controlling supply of current and static capacitance to a compressor of the present invention will be explained with reference to FIG. 6.

Upon reception of a utility voltage from the utility voltage supply 63, the second controlling part(a microcomputer) 64 in the control device is initialized, and determines a state of the utility voltage, i.e., a voltage and a frequency thereof. And, the temperature sensing part 67 senses an external temperature of the compressor 76, and provides to the second controlling part 64. Then, the second controlling part 64 generates a phase control signal and a switching control signal for providing to the current controlling part 65 and the static capacitance controlling part 66 according to the determined state of the utility voltage and the external temperature. A starting time is determined, at which a current from the current controlling part 65 is provided to the starting capacitor 71 of the static capacitance controlling part 66, and the switching control signal is generated, and provided to the second switch 69 and the third switch 70. According to the switching control signal, the third switch 70 is turned on and the second switch 69 is turned off. That is, the second switch 69 and the third switch 70 are operative oppositely in response to the switching control signal. And, for controlling the phase of the current of the utility voltage supplied to the main winding 73 of the compressor 76, the second controlling part 64 provides the phase control signal, which may vary with a voltage value received from the temperature sensing part 67. That is, the second controlling part 64 compares the external temperature measured presently and a preset reference temperature, to find a season pertinent to the present external temperature and provide phase control signals consistent to the season. The phase control signal is provided to a gate of the triac 68 in forms of pulses. For example, in a case the external temperature is higher than T1 set as a reference temperature for summer, a pulse width of the phase control signal provided to the triac 68 is set to P3 of summer, in a case the external temperature is below T3 set as a reference temperature for winter, a pulse width of the phase control signal is set to P1 of winter, and, if the external temperature is T2 between T1 and T3 set as a reference temperature for spring and fall, a pulse width of the phase control signal is set to P2 of spring and fall. For reference, in starting the compressor 76, the pulse width of the phase control signal is required to be large if the external temperature is low because the low external temperature leads a viscosity of the refrigerant poor to restrict a compressor motor substantially. Therefore, P1 has the largest pulse width, P2 has a next large pulse width, and P3 has the smallest pulse width. According to the phase control signal set with respective to a season, the triac 68 is driven, and a current provided to the main winding 73 is varied. As explained, the phase control signal is a rectangular signal provided to the gate of the triac 68, a duty ratio thereof is fixed, not only based on the external temperature, but also based on a size of the utility voltage sensed already, and an output time point thereof is fixed based on the frequency value of the utility voltage. The supplementary winding 74 of the compressor 76 is required to be provided with a great static capacitance for improving starting characteristics. Accordingly, the operating capacitor 72 and the starting capacitor 71 are connected in parallel by the operation of the third switch 70, to provide the starting static capacitance and the operation static capacitance to the supplementary winding 74 during starting. In this instance, the starting capacitor 71 is provided with the current from the current controlling part 65 and the operating capacitor is provided with the current of the utility voltage.

In the meantime, once the starting is completed, only the operation capacitance from the operating capacitor 72 is provided to the supplementary winding 74 as the third switch 70 is turned off(or opened) during operation of the compressor 76. In this instance, the operating capacitor 72 is provided with the current of the utility voltage. As explained, the phase control signal and the switching control signal for the compressor 76 are dependent on the state of the utility voltage. That is, if the utility voltage is lower than reference voltages, turn on time periods of the triac 68 and the third switch 70 are set longer, to make the compressor 76 started well even at a lower voltage. Opposite to this, if the utility voltage is higher than the reference voltages, turn on time periods of the triac 68 and the third switch 70 are set shorter, for preventing flow of an excessive current to the main winding 73. For preventing flow of an excessive current to the main winding 73 in starting the compressor 76, as the phase control signal provided to the triac 68, a fixed voltage of a limited first size is provided to the gate of the triac 68 such that a fixed current of a limited first size flows to the main winding 73 in an initial time period of starting, a gradually rising voltage is provided to the gate of the triac 68 such that a gradually increasing current flows to the main winding 73 in a middle time period of the starting, and a fixed voltage of a regular size is provided to the gate of the triac 66 such that a current of a regular size flows to the main winding 73. As explained, if the third switch 70 is turned on and the triac 68 comes into operation, to start the compressor 76, the third switch 70 is turned off to leave open, to cut off the static capacitance supplied to the supplementary winding 74 through the starting capacitor 71. Accordingly, during operation of the compressor 76, the operating static capacitance is supplied to the supplementary winding 74 only through the operating capacitor 72. When a preset time period is passed after the third switch 70 is turned off, the second switch 69 is turned on, to lead the current of the utility voltage to the main winding 73 through the turned on second switch 69 instead of the triac 68. In this instance, for stable operation of the control device, the triac 68 is kept turned on for a preset time period even after the third switch 70 is turned off and the second switch 69 is turned on. Thereafter, the current is provided to the main winding 73 only through the turned on second switch 69. Accordingly, the current of this time is not of a size limited like in the starting, but regular of the utility voltage. On the other hand, if the first switch 62 is turned off to leave open in response to a compressor driving control signal from the first controlling part 61, as a main controlling part, the utility voltage is supplied to the compressor 76 no more, to stop operation of the compressor 76.

As explained, the third embodiment device of the present invention can optimize starting of the compressor as the phase control signal provided to the triac is varied with seasons, appropriately. And, as the static capacitance controlling part is provided with the current of the utility voltage as well as the current from the current controlling part, a great static capacitance is generated. Accordingly, the second embodiment device is favorable to a large capacity compressor.

Figure 7:
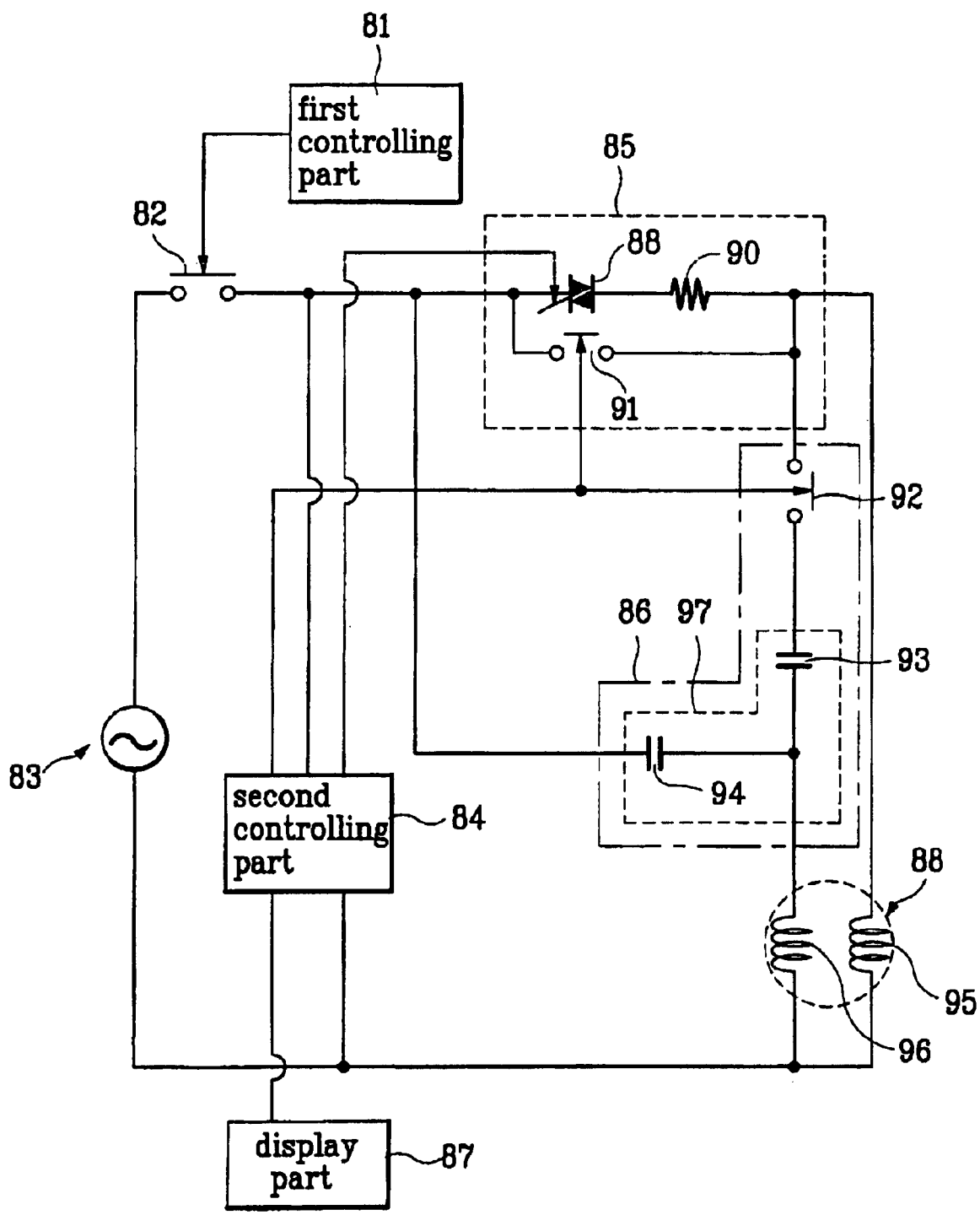
FIG. 7 illustrates a diagram showing a device for controlling supply of current and static capacitance to a compressor in accordance with a fourth preferred embodiment of the present invention.

FIG. 7 illustrates a diagram showing a device for controlling supply of current and static capacitance to a compressor in accordance with a fourth preferred embodiment of the present invention.

Referring to FIG. 7, the device for controlling supply of current and static capacitance to a compressor in accordance with a fourth preferred embodiment of the present invention includes a first controlling part 81 for providing a driving turn on/off signal for the compressor 88 according to a user's selection, a first switch 88 for supplying a utility voltage or cutting off the supplying of the utility voltage to the compressor 88 in response to the driving turn on/off signal, a second controlling part 84 for providing a phase control signal and a switching control signal different in starting and after starting of the compressor 88 depending on a size and a frequency of the utility voltage, and a display signal for displaying a state of a current according to a current to the main winding 95, a current controlling part 85 having an internal circuit changeable in response to the switching control signal and the phase control signal, for limiting the current of the utility voltage in supplying the current to the main winding 95 of the compressor 88 during starting and supplying the regular size current of the utility voltage after the starting, a current detecting part 90 connected to an output side of the current controlling part 85 for detecting a current to the main winding 95 of the compressor 88 and providing to the second controlling part 84, a display part 87 for displaying the state of the current to the main winding 95 in response to the display signal, and a static capacitance controlling part 86 having an internal circuit changeable in response to the switching control signal for supplying a starting static capacitance of the current from the current controlling part 85 and an operative static capacitance of a current of the utility voltage to the starting supplementary winding 96 of the compressor 88 during starting, and supplying the operative static capacitance of the current of the utility voltage only to the starting supplementary winding 96 of the compressor 88 after the starting. The current detecting part 90 may be a resistor connected between the current controlling part 85 and the main winding 95, and the display part 87 may be an LED(Light Emitting Diode), or other. In the present invention, the LED 87 flashes if the current to the main winding 95 detected in response to the display signal is greater than a preset first overcurrent, turns on if the current is smaller than the first overcurrent and greater than a preset second overcurrent(the first overcurrent>the second overcurrent), turns off if the current is smaller than the second overcurrent In FIG. 7, the current controlling part 85 supplies a current to the main winding 95 in a direction the current is increased gradually between an initial starting point to a starting completion point in response to the switching control signal. And, the current controlling part 85 includes a second switch 91 for switching on/off between an output contact point of the first switch 82 and the main winding 95 in response to the switching control signal, and a phase controlling part 89 connected to the second switch 91 between an input contact point and an output contact point thereof in parallel for controlling a phase of the current supplied to the main winding 95 depending on a switching on/off state of the second switch 91 and the phase control signal. The static capacitance controlling part 86 includes a third switch 92 having an input contact point connected both to an output terminal of the phase controlling part 89 and an output contact point of the second switch 91 for switching on/off opposite to the second switch 91 in response to the switching control signal, and a static capacitance generating part 97 having a first input terminal connected to an output contact point of the second switch 91, a second input terminal connected to an output contact point of the first switch 82, and an output terminal connected to the supplementary winding 96 for providing a required static capacitance to the supplementary winding 96 depending on a switching on/off state of the third switch 92. In response to the switching control signal, the second switch 91 connects the output contact point of the first switch 82 and the main winding 95 through the phase controlling part 89 in starting, and connects the output contact point of the first switch 82 and the main winding 95 directly after the starting. The third switch 92 is switched in response to the switching control signal, to connect both an output terminal of the phase controlling part 89 and an output contact point of the first switch 82 to the supplementary winding 96 through the static capacitance generating part 97 so that the static capacitance generating part 97 generates a starting static capacitance and an operation static capacitance in staring, and to connect only the output contact point of the first switch 82 to the supplementary winding 96 through the static capacitance generating part 97 so that the static capacitance generating part 97 generates only the operation static capacitance after the starting. The phase controlling part 89 may be a triac to be driven in response to the phase control signal for controlling the phase of the current supplied to the main winding 95. The phase controlling part will be called as the triac 89 hereafter. The static capacitance generating part 97 in the static capacitance controlling part 86 includes a starting capacitor 93 connected between an output contact point of the third switch 92 and the supplementary winding 96, and operating capacitor 94 connected between an output contact point of the first switch 82 and the supplementary winding 96 and connected to the starting capacitor 93 in parallel. The static capacitance generating part 97 is provided with the current from the current controlling part 85 along with the current of the utility voltage, thereby permitting to provide a great static capacitance.

The operation of the fourth embodiment device for controlling supply of current and static capacitance to a compressor of the present invention will be explained with reference to FIG. 7.

Upon reception of the utility voltage from the utility voltage supply 83, the second controlling part(a microcomputer) 84 in the control device is initialized, and determines a state of the utility voltage, i.e., a voltage and a frequency thereof. And, the current detecting part 90 detects a current flowing to the main winding 95 of the compressor 88 presently, and provides to the second controlling part 84. Then, the second controlling part 84 generates a phase control signal and a switching control signal for providing to the current controlling part 85 and the static capacitance controlling part 86 according to the determined state of the utility voltage and the current to the main winding. That is, a starting time is determined, at which the utility voltage is provided to the starting capacitor 93 of the static capacitance controlling part 86, and the switching control signal is generated, and provided to the second switch 91 and the third switch 92. According to the switching control signal, the third switch 92 is turned on and the second switch 91 is turned off. That is, the second switch 91 and the third switch 92 are operative oppositely in response to the switching control signal. In other words, when the second switch 91 is opened, the third switch 92 is closed. And, the second controlling part 84 provides the display signal for informing a state of the present current to the main winding 95 of the compressor 88. As explained, the display signal may vary with a current value flowing to the main winding 95, presently. That is, the second controlling part 84 compares the measured present current value to the main winding 95 and a preset reference overcurrent, to find a state of the present current value and provide a phase control signal consistent to the state. For example, in a case the current to the main winding 95 is greater than the preset first overcurrent, the LED 87 is made to flash to give alarm to the user, if the detected current is lower than the preset first overcurrent and greater than a preset second overcurrent, the LED 87 is turned on so that the user can make a service call, and in a case the detected current to the main winding 95 is lower than the preset second overcurrent, the second controlling part 84, assuming that it as a regular state, turns off the LED. This display method may be replaced with other method. As explained in other embodiments already, the phase control signal is a rectangular signal provided to the gate of the triac 89, a duty ratio thereof is fixed based on a size of the utility voltage sensed already, and an output time point of the pulse is fixed based on the frequency value of the utility voltage sensed already. The supplementary winding 96 of the compressor 88 is required to be provided with a great static capacitance for improving starting characteristics. Accordingly, the operating capacitor 94 and the starting capacitor 93 are connected in parallel by the operation of the third switch 92, to provide the starting static capacitance and the operation static capacitance to the supplementary winding 96 during starting. In the present invention, the starting capacitor 93 is provided with the current from the current controlling part 85, and the operating capacitor 94 is provided with the current of the utility voltage.

In the meantime, once the starting of the compressor 88 is completed, only the operation capacitance from the operating capacitor 94 is provided to the supplementary winding 96 as the third switch 92 is turned off (or opened) during operation of the compressor 88. As explained, the phase control signal and the switching control signal for the compressor 88 are dependent on the state of the utility voltage. That is, if the utility voltage is lower than reference voltages, turn on time periods of the triac 89 and the third switch 92 are set longer, to make the compressor 88 started well even at a lower voltage. Opposite to this, if the utility voltage is higher than the reference voltages, turn on time periods of the triac 89 and the third switch 92 are set shorter, for preventing flow of an excessive current to the main winding 95. For preventing flow of an excessive current to the main winding 95 in starting the compressor 88, as the phase control signal provided to the triac 89, a fixed voltage is provided to the gate of the triac 89 such that a fixed current of a first limited size flows to the main winding 95 in an initial time period of starting, a gradually rising voltage is provided to the gate of the triac 89 such that a gradually increasing current flows to the main winding 95 in a middle time period of staring, and a fixed voltage is provided to the gate of the triac 66 such that a current of a second size flows to the main winding 95 in a fmal time period of starting. As explained, if the third switch 92 is turned on and the triac 89 comes into operation, to start the compressor 88, the third switch 92 is turned off to leave open, to cut off the current supplied to the supplementary winding 96 through the starting capacitor 93. Accordingly, during operation of the compressor 88, the current is supplied to the supplementary winding 96 only through the operating capacitor 94. On the other hand, if the first switch 82 is turned off to leave open in response to a compressor driving control signal from the first controlling part 81, as a main controlling part, the utility voltage is supplied to the compressor 88 no more, and operation of the compressor 88 is stopped.

As explained, the fourth embodiment device of the present invention permits to sense a current to the main winding always, and as a state of the sensed state is displayed to outside of the control device, the user to sense an overcurrent to the main winding. And, as the static capacitance controlling part is provided with the current of the utility voltage as well as the current from the current controlling part, a great static capacitance can be provided to the supplementary winding in starting. Accordingly, the second embodiment device is favorable to a large capacity compressor.

Figure 8:
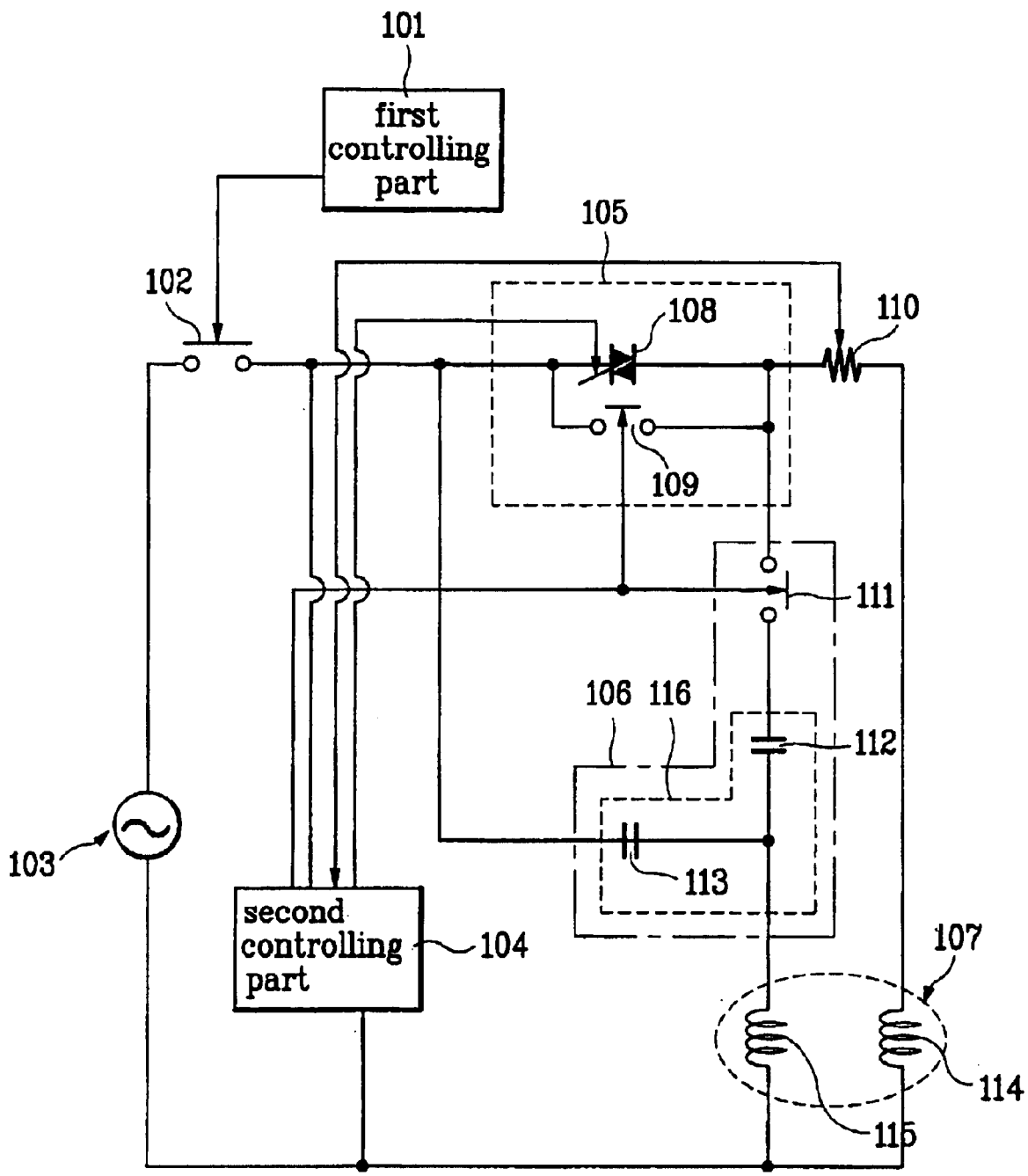
FIG. 8 illustrates a diagram showing a device for controlling supply of current and static capacitance to a compressor in accordance with a fifth preferred embodiment of the present invention.

FIG. 8 illustrates a diagram showing a device for controlling supply of current and static capacitance to a compressor in accordance with a fifth preferred embodiment of the present invention.

Referring to FIG. 8, the device for controlling supply of current and static capacitance to a compressor in accordance with a fifth preferred embodiment of the present invention includes a first controlling part 101 for providing a driving turn on/off signal for the compressor 107 according to a user's selection, a first switch 102 for supplying the utility voltage or cutting off the supplying of the utility voltage to the compressor 107 in response to the driving signal, a second controlling part 104 for providing a phase control signal and a switching control signal to vary with a current to a main winding 114 of the compressor 107 and a state of the utility voltage(a size and a frequency), and different in starting and after the starting of the compressor 107, a current controlling part 105 having an internal circuit changeable in response to the switching control signal and the phase control signal for limiting the current of the utility voltage in supplying the current to the main winding 114 of the compressor 107 during starting and supplying the current of the utility voltage as it is after the starting, a current detecting part 110 connected to an output side of the current controlling part 105 for detecting a current to the main winding 114 of the compressor 107 and providing to the second controlling part 104, and a static capacitance controlling part 106 having an internal circuit changeable in response to the switching control signal for supplying a starting static capacitance of the current from the current controlling part 105 and an operative static capacitance of a current of the utility voltage to the starting supplementary winding 115 of the compressor 107 during starting, and supplying only the operative static capacitance of the current of the utility voltage to the starting supplementary winding 115 of the compressor 107 after the starting. In FIG. 8, the current detecting part 110 may be a resistor connected between the current controlling part 105 and the main winding 114. The current controlling part 105 supplies a current to the main winding 114 in a direction the current is increased gradually between an initial starting point to a starting completion point in response to the switching control signal and the phase control signal. And, the current controlling part 105 includes a second switch 109 for switching on/off between an output contact point of the first switch 102 and the main winding 114 in response to the switching control signal, and a phase controlling part 108 connected to the second switch 109 between an input contact point and an output contact point thereof in parallel for controlling a phase of the current supplied to the main winding 114 depending on a switching on/off state of the second switch 109 and the phase control signal. The static capacitance controlling part 106 includes a third switch 111 having an input contact point connected both to an output terminal of the phase controlling part 108 and an output contact point of the second switch 109 for switching on/off in response to the switching control signal, and a static capacitance generating part 116 having a first input terminal connected to an output contact point of the second switch 109, a second input terminal connected to an output contact point of the first switch 102, and an output terminal connected to the supplementary winding 115 for providing a required static capacitance to the supplementary winding 115 depending on a switching on/off state of the third switch 111. In response to the switching control signal, the second switch 109 connects the output contact point of the first switch 102 and the main winding 114 through the phase controlling part 108 in starting, and connects the output contact point of the first switch 102 and the main winding 114 directly after the starting. The third switch 111 is switched in response to the switching control signal, to connect both an output terminal of the phase controlling part 108 and an output contact point of the first switch 102 to the supplementary winding 115 through the static capacitance generating part 116 so that the static capacitance generating part 116 generates a great starting static capacitance in starting, and to connect only the output contact point of the first switch 102 to the supplementary winding 115 through the static capacitance generating part 116 so that the static capacitance generating part 116 generates a relatively small static capacitance after the starting. Thus, the device of the present invention includes the static capacitance generating part 116 in the static capacitance controlling part 106 provided both with the current from the current controlling part 105 and the current of the utility voltage, to make a great static capacitance available to the supplementary winding 115 in the starting. In the current controlling part 105, the phase controlling part 108 is a triac operative in response to the phase control signal for controlling the phase of the current to the main winding 114, and will be called as the triac 108 hereafter. The triac 108 will be turned on for a longer time period in response to a varied phase control signal if the utility voltage is lower than a reference utility voltage, and turned on for a shorter time period in response to the varied phase control signal if the utility voltage is higher than the reference utility voltage, thereby permitting to keep stable supply of current to the main winding 114. The static capacitance generating part 116 in the static capacitance controlling part 106 includes a starting capacitor 112 connected between an output contact point of the third switch 111 and the supplementary winding 115 for providing a starting static capacitance required for a starting torque to the supplementary winding 115 in starting, and operating capacitor 113 connected between an output contact point of the first switch 111 and the supplementary winding 115 in series and connected to the starting capacitor 112 in parallel for providing an operating static capacitance in starting and after the starting. In the starting, the starting capacitor 112 is provided with the current from the current controlling part 105, and the operating capacitor 113 is provided with the current of the utility voltage.

The operation of the fifth embodiment device for controlling supply of current and static capacitance to a compressor of the present invention will be explained with reference to FIG. 8.

Upon reception of the utility voltage from the utility voltage supply 103, the second controlling part(a microcomputer) 104 in the control device is initialized, and determines a state of the utility voltage, i.e., a voltage and a frequency thereof. And, the current detecting part 110 detects a current flowing to the main winding 114 of the compressor 107 presently, and provides to the second controlling part 104. Then, the second controlling part 104 generates a phase control signal and a switching control signal for providing to the current controlling part 105 and the static capacitance controlling part 106 according to the determined state of the utility voltage and the current to the main winding. That is, a starting time is determined, at which the utility voltage is provided to the starting capacitor 112 of the static capacitance controlling part 106, and the switching control signal is generated, and provided to the second switch 109 and the third switch 111. According to the switching control signal, the third switch 111 is turned on and the second switch 109 is turned off. That is, the second switch 109 and the third switch 111 are operative oppositely in response to the switching control signal, i.e., when the second switch 109 is turned on, the third switch 111 is turned off, and when the third switch 111 is turned on, the second switch 109 is turned off. And, the second controlling part 104 provides a starting voltage value at the main winding 114 by multiplying the present current value to the main winding 114 of the compressor 107 and a resistance of the current detecting part 110(hereafter called as a resistor 110). The phase control signal may vary with the measured current to the main winding 114 presently, i.e., the starting voltage value. That is, the second controlling part 104 compares the measured present starting voltage value to a preset overvalues, to find a state of the present current value to the main winding 114 and vary the phase control signal consistent to the state. For example, in a case the current to the main winding 114 is greater than the preset first overcurrent, the second controlling part 104 informs the fact to the first controlling part 101 so that the first controlling part 101 knows that the compressor 107 is in a critical state. Then, the first controlling part 101 applies a driving turn off signal to the first switch 102, to turn off, to open the first switch 102. Accordingly, the utility voltage will be supplied to the compressor no more, and the compressor 107 stops the operation. In a case the detected current to the main winding 114 is lower than the preset first overcurrent and greater than the preset second overcurrent, assuming that an overcurrent flows to the main winding 114, the second controlling part 104 reduces a width of the phase control signal applied to the gate of the triac 108 in a form of pulse. And, in a case the detected current to the main winding 114 is lower than the preset second overcurrent, assuming that it as a regular state, the second controlling part 104 maintains an initial phase control value as it is and provides to the triac 108. This phase control signal varying method may be replaced with other method. As explained in other embodiments already, the phase control signal is a rectangular signal provided to the gate of the triac 108, a duty ratio thereof is fixed based on a size of the utility voltage sensed already, and an output time point of the pulse is fixed based on the frequency value of the utility voltage sensed already. The supplementary winding 115 of the compressor 107 is required to be provided with a great static capacitance for improving starting characteristics. Accordingly, the operating capacitor 113 and the starting capacitor 112 are connected in parallel by the operation of the third switch 111, to provide the starting static capacitance and the operation static capacitance to the supplementary winding 115 during starting. In this instance, the static capacitance generating part 116 in the static capacitance controlling part 106 is provided with two currents. As the third switch 111 is turned on to close the circuit, the starting capacitor 112 is provided with the current from the current controlling part 105, to produce the starting static capacitance at the starting capacitor 112. And, the operating capacitor 113, connected to the output contact point of the first switch 102, is provided with the current of the utility voltage, to produce the operating static capacitance at the operating capacitor 113. Thus, in this embodiment device, as the static capacitance is generated by the two currents, a great static capacitance can be made available to the supplementary winding 115 in starting. Accordingly, the present invention is favorable for a large capacity compressor.

In the meantime, once the starting of the compressor 107 is completed, only the operation capacitance from the operation supporting capacitor 113 is provided to the supplementary winding 115 as the third switch 111 is turned off(or opened) during operation of the compressor 107. As explained, the phase control signal and the switching control signal for the compressor 107 are dependent on the state of the utility voltage in an initial stage of operation of the compressor 107. That is, if the utility voltage is lower than reference voltages, turn on time periods of the triac 108 and the third switch 111 are set longer, to make the compressor 107 started well even at a lower voltage. Opposite to this, if the utility voltage is higher than the reference voltages, turn on time periods of the triac 108 and the third switch 111 are set shorter, for preventing flow of an excessive current to the main winding 114. For preventing flow of an excessive current to the main winding 114 in starting of the compressor 107, as the phase control signal provided to the triac 108, a fixed voltage is provided to the gate of the triac 108 such that a fixed current of a first limited, fixed size flows to the main winding 114 in an initial time period of the starting, a gradually rising voltage is provided to the gate of the triac 108 such that a current gradually increasing from a first size to a second size flows to the main winding 114 in a middle time period of the starting, and a fixed voltage is provided to the gate of the triac 108 such that a current of the second size flows to the main winding 114 in a final time period of starting. As explained, if the third switch 111 is turned on and the triac 108 comes into operation, to start the compressor 107, the third switch 111 is turned off to leave open, to cut off the current supplied to the supplementary winding 115 through the starting capacitor 112. Accordingly, during operation of the compressor 107 after the starting, the operating static capacitance is supplied to the supplementary winding 115 only through the operating capacitor 113. On the other hand, if the first switch 102 is turned off to leave open in response to a compressor driving control signal from the first controlling part 101, as a main controlling part, the utility voltage is supplied to the compressor 107 no more, to stop operation of the compressor 107.

As explained, the fifth embodiment device of the present invention permits to adjust an excessive starting voltage by detecting the starting voltage supplied to the compressor through the current detecting part, and stopping operation of the compressor or changing the phase control signal if it is assumed that the detected starting voltage exceeds a regular size. And, since the supplementary winding is provided with a static capacitance both of the current of the utility voltage and the current from the current controlling part, the fifth embodiment device of the present invention is favorable for a large capacity compressor.

Figure 9:
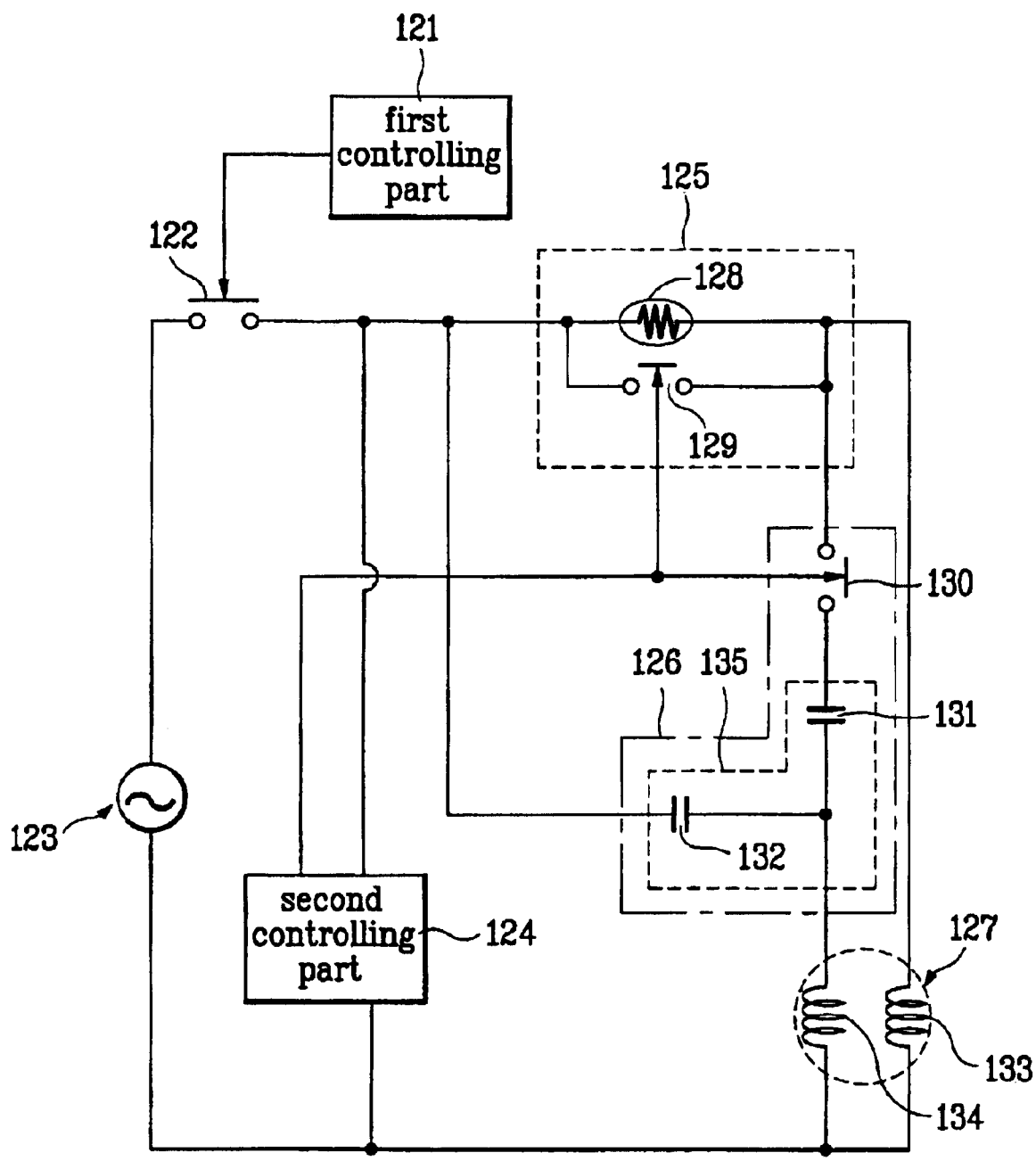
FIG. 9 illustrates a diagram showing a device for controlling supply of current and static capacitance to a compressor in accordance with a sixth preferred embodiment of the present invention; and, FIG. 10 illustrates a graph showing resistance characteristics of a negative temperature coefficient resister.

FIG. 9 illustrates a diagram showing a device for controlling supply of current and static capacitance to a compressor in accordance with a sixth preferred embodiment of the present invention.

Referring to FIG. 9, the device for controlling supply of current and static capacitance to a compressor in accordance with a sixth preferred embodiment of the present invention includes a first controlling part 121 for providing a driving turn on/off signal for the compressor 127 according to a user's selection, a first switch 122 for supplying a utility voltage to the compressor 127 in response to the driving turn on/off signal, a second controlling part 124 for providing a switching control signal to vary with a size and a frequency of the utility voltage and different in starting and after starting, a current controlling part 125 having variable resistance characteristics reversely proportional to a temperature thereof and an internal circuit changeable in response to the switching control signal for limiting the current of the utility voltage in supplying the current to the main winding 133 of the compressor 127 in starting and supplying the current of the utility voltage after the starting, and a static capacitance controlling part 126 having an internal circuit changeable in response to the switching control signal for supplying a starting static capacitance of a current from the current controlling part 125 and an operative static capacitance by the utility voltage supply to the starting supplementary winding 134 of the compressor 127 during starting, and supplying only the operative static capacitance of the current of the utility voltage to the starting supplementary winding 134 of the compressor 127 after the starting. In FIG. 9, the current controlling part 125 supplies a current to the main winding 133 in a direction the current is increased gradually between an initial starting point to a starting completion point in response to the switching control signal. And, the current controlling part 125 includes a second switch 129 and a negative temperature coefficient resister 128. The second switch 129 has an input contact point connected to an output contact point of the first switch 122 and an output contact point connected to the main winding 133 for switching on/off between the output contact point of the first switch 122 and the main winding 133 in response to the switching control signal. The negative temperature coefficient resister 128 having an input terminal connected to an output contact point of the first switch 122 and an output terminal connected to the main winding 133, with the input terminal and the output terminal connected to an input contact point and an output contact point of the second switch 129 in parallel respectively for limiting the current to the main winding 133 in starting of the compressor 127. The static capacitance controlling part 126 includes a third switch 130 and a static capacitance generating part 135. The third switch 130 has an input contact point connected to an output contact point of the second switch 129 for switching on/off opposite to the second switch 129 in response to the switching control signal. For stable operation, the second switch 129 and the third switch 130 have an overlap time period in which both of the second switch 129 and the third switch 130 are in a turned on state. And, the static capacitance generating part 135 is connected between output contact point of the third switch 130 and the supplementary winding 134 for providing a static capacitance of the current from the current controlling part 125 and the current of the utility voltage to the supplementary winding 134 in starting and the static capacitance only of the current of the utility voltage after the starting depending on a switching state of the third switch 130. The second switch 129 changes an internal circuit of the current controlling part 125 in response to the switching control signal, to connect the output contact point of the first switch 122 and the main winding 133 through the negative temperature coefficient resister 128, the phase controlling part, in starting, and connects the output contact point of the first switch 122 and the main winding 133 directly after the starting without passing through the negative temperature coefficient resister 128. The third switch 130 is switched to change an internal circuit of the static capacitance controlling part 126 in response to the switching control signal, so that the static capacitance generating part 135 generates a great static capacitance in starting and only a limited small static capacitance after the starting. That is, in the starting, the third switch 130 is switch on to provide the current limited by the negative temperature coefficient resister 128 to the static capacitance generating part 135 in addition to the current of the utility voltage. The static capacitance generating part 135 includes a starting capacitor 131 connected between an output contact point of the third switch 130 and the supplementary winding 134 for providing a starting static capacitance of the current from the first current controlling part 125 to the supplementary winding 134 for providing a starting torque to the supplementary winding 134 in starting, and an operating capacitor 132 connected between the first switch 122 and the supplementary winding 134 and connected to the starting capacitor 131 in parallel for providing an operating static capacitance of the current of the utility voltage to the supplementary winding 134 in starting and during operation.

The operation of the sixth embodiment device for controlling supply of current and static capacitance to a compressor of the present invention will be explained with reference to FIG. 9.

Upon reception of the voltage of the utility voltage supply 143(a utility voltage), the second controlling part(a microcomputer) 124 in the control device is initialized, and determines a state of the utility voltage, i.e., a voltage and a frequency thereof. Then, the second controlling part 124 generates a switching control signal for providing to the current controlling part 125 and the static capacitance controlling part 126 according to the determined state of the utility voltage. That is, a starting time is determined, at which the utility voltage is provided to the starting capacitor 131 of the static capacitance controlling part 126, and the switching control signal is generated, and provided to the second switch 129 and the third switch 130. According to the switching control signal, the third switch 130 is turned on and the second switch 129 is turned off. That is, the second switch 129 and the third switch 130 are operative oppositely in response to the switching control signal. The supplementary winding 134 of the compressor 127 is required to be provided with a great static capacitance for improving starting characteristics, particularly a large capacity compressor. Accordingly, the operating capacitor 132 and the starting capacitor 131 are connected in parallel by the switching on operation of the third switch 130, to provide the great static capacitance composed of the starting static capacitance and the operation static capacitance to the supplementary winding 134 during starting. In this instance, the starting capacitor 131 is provided with the current from the current controlling part 125, and the operating capacitor 132 is provided with the current of the utility voltage.

Figure 10:
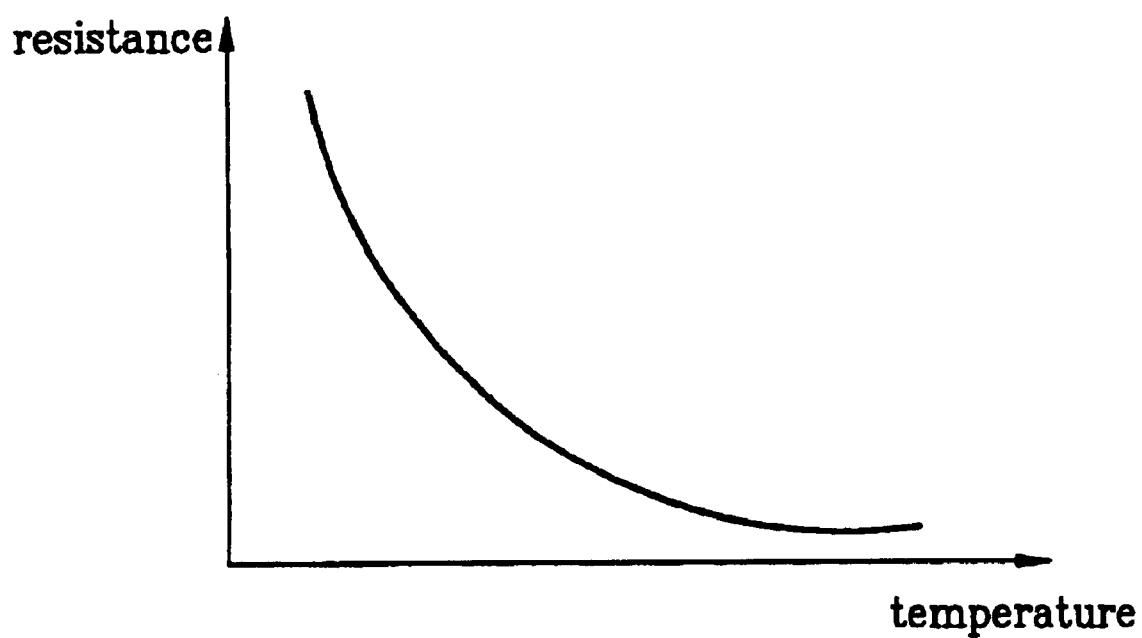

In the meantime, once the starting of the compressor 127 is completed, only the operation capacitance from the operation supporting capacitor 132 is provided to the supplementary winding 134 as the third switch 130 is turned off(or opened) during operation of the compressor 127. As explained, the switching control signal for the compressor 127 are dependent on the state of the utility voltage in an initial stage of operation of the compressor 127. That is, if the utility voltage is lower than reference voltages, a turn on time period of the third switch 130 is set longer, to make the compressor 127 started well even at a lower voltage. Opposite to this, if the utility voltage is higher than the reference voltages, the turn on time period of the third switch 130 is set shorter, for preventing flow of an excessive current to the main winding 133. In an initial starting of the compressor 127, if the second switch 129 is turned off to leave open and the negative temperature coefficient resister 128 is provided with the utility voltage, the negative temperature coefficient resister 128 limits the utility voltage thereby preventing an overcurrent from flowing to the main winding 133 of the compressor 127. The negative temperature coefficient resister 128 has an adequate initial resistance that can prevent a starting current supplied to the main winding 133 in the starting of the compressor not to exceed a desired starting current. That is, as shown in FIG. 10, since the negative temperature coefficient resister 128 has a resistance component which becomes the lower as the temperature thereof becomes the higher, the negative temperature coefficient resister 128 limits the initial starting current to the main winding 133 of the compressor 127 by means of the initial great resistance. In continuation, as shown in FIG. 10, if a current for the utility voltage is supplied to the negative temperature coefficient resister 128, the negative temperature coefficient resister itself generates heat to reduce the initial resistance, sharply. Then, upon completion of the starting after a while, the switching control signal turns on the second switch 129, to cut off the circuit, such that the current of the utility voltage flows to the main winding 133 through the second switch 129 in a regular size without passing through the negative temperature coefficient resister 128. As explained, upon completion of starting of the compressor 127, the third switch 130 is turned off to leave open, to cut off the current from the current controlling part 125 supplied to the supplementary winding 134 through the starting capacitor 131. Accordingly, during operation of the compressor 127 after the starting, only the operating static capacitance is supplied to the supplementary winding 134 through the operating capacitor 132. As explained, the operating capacitor 132 is only provided with the current of the utility voltage. On the other hand, if the first switch 122 is turned off to leave open in response to a compressor driving control signal from the first controlling part 121, a main controlling part, owing to the user's selection, the utility voltage is supplied to the compressor 127 no more, to stop operation of the compressor 127.

As explained, the sixth embodiment device of the present invention permits, not only to enhance a starting effect of the compressor as the static capacitance generating part is provided, not only with the current from the current controlling part but also with the current of the utility voltage, but also to prevent supply of excessive current to the main winding, by limiting a staring current supplied to the compressor in an initial starting by using a negative temperature coefficient resister which has a great initial resistance and variable resistance characteristics reversely proportional to a temperature.

It will be apparent to those skilled in the art that various modifications and variations can be made in device and method for controlling supply of current and static capacitance to a compressor of the present invention without departing from the spirit or scope of the invention. Thus, it is intended that the present invention cover the modifications and variations of this invention provided the y come within the scope of the appended claims and the ir equivalents.

What is claimed is:

1. A device for controlling supply of current and static capacitance to a compressor comprising:
   a control signal generating part for providing control signals for controlling a current and a static capacitance of a utility voltage to be provided to a main winding and supplementary winding of the compressor, the current and static capacitance being different in starting of the compressor and after the starting of the compressor;
   a current controlling part for limiting the current of the utility voltage to the main winding in the starting of the compressor and supplying the current to the main winding regularly after the starting of the compressor in response to the control signal; and
   a static capacitance controlling part for supplying both a starting static capacitance and an operative static capacitance to a supplementary winding in the starting of the compressor, and for supplying only the operative static capacitance after the starting of the compressor, in response to the control signal.

2. The device as claimed in claim 1, wherein the control signal generating part includes:
   a transformer part for obtaining at least one voltage value from the utility voltage;
   a voltage size sensing part for sensing a size of the utility voltage from the obtained at least one voltage value; and
   a controlling part for generating the control signal depending on a sensed size of the voltage, and providing the control signal to the current controlling part and the static capacitance controlling part.

3. A device for controlling supply of current and static capacitance to a compressor comprising:
   a first controlling part for generating a driving turn on/off signal for the compressor according to a user's selection;
   a first switch for supplying, or cutting off the supplying of a utility voltage to the compressor in response to the driving turn on/off signal;
   a second controlling part for generating a phase control signal and a switching control signal for the utility voltage depending on a size of the utility voltage;
   a current controlling part having an internal circuit changeable in response to the switching control signal and the phase control signal, for supplying a small current of a limited size to a main winding of the compressor in starting of the compressor in response to the phase control signal and for supplying a regular current of the utility voltage to the main winding after the starting of the compressor; and a static capacitance controlling part having an internal circuit changeable in response to the switching control signal, for supplying both a starting static capacitance and an operative static capacitance to a supplementary winding in the starting of the compressor, and for supplying only the operative static capacitance after the starting of the compressor,
   wherein the current controlling part includes:
      a second switch for switching on/off between an output contact point of the first switch and the main winding in response to the switching control signal; and
      a phase controlling part connected in parallel to the second switch between an input contact point and an output contact point thereof for controlling a phase of a voltage to be supplied to the main winding depending on a switching on/off state of the second switch and the phase control signal; and
   wherein the static capacitance controlling part includes:
      a third switch having an input terminal connected to an output side of the current controlling part for operating in response to the switching control signal; and
      a static capacitance generating part having a first input terminal connected to an output contact point of the third switch, a second input terminal connected to an output contact point of the first switch, and an output terminal connected to the supplementary winding, for providing a required static capacitance to the supplementary winding depending on switching on/off states of the second switch and the third switch.

4. The device as claimed in claim 3, wherein the current controlling part supplies a current to the main winding in a gradually increasing direction from an initial starting of the compressor to completion of the starting of the compressor in response to the switching control signal.

5. A The device as claimed in claim 3, wherein, in response to a variable phase control signal, the phase controlling part is turned on longer if the utility voltage is lower than a reference utility voltage, and is turned on shorter if the utility voltage is higher than the reference utility voltage.

6. The device as claimed in claim 3, wherein the second switch is switched in response to the switching control signal such that an output contact point of the first switch and the main winding are connected through the phase controlling part in the starting of the compressor and the output contact point of the first switch and the main winding directly after the starting of the compressor; and
   the third switch is switched in response to the switching control signal to connect both an output terminal of the phase control signal and an output contact point of the first switch connected to the supplementary winding through the static capacitance generating part so that the static capacitance generating part has the starting static capacitance and the operating static capacitance in the starting of the compressor, and to connect an output contact point of the first switch to the supplementary winding through the static capacitance generating part so that the static capacitance generating part has only the operating static capacitance.

7. The device as claimed in claim 3, wherein the phase controlling part is a triac for controlling a phase of the voltage supplied to the main winding in response to the phase controlling signal.

8. The device as claimed in claim 3, wherein the static capacitance generating part includes:
   a starting capacitor connected between an output contact point of the third switch and the supplementary winding; and an operating capacitor connected between an input contact point of the third switch and the supplementary winding, and in parallel to the starting capacitor.

9. A device for controlling supply of current and static capacitance to a compressor comprising:
- a first controlling part for generating a driving turn on/off signal for the compressor according to a user's selection;
- a first switch for supplying, or cutting off the supplying of a utility voltage to the compressor in response to the driving turn on/off signal;
- a second controlling part for generating a phase control signal and a switching control signal for the utility voltage depending on a size of the utility voltage;
- a current controlling part having an internal circuit changeable in response to the switching control signal and the phase control signal for providing a small sized limited current to the supplementary winding of the compressor according to the phase control signal in starting of the compressor, and a current of a size great corresponding to the utility to the main winding after the starting of the compressor; and
- a static capacitance controlling part having an internal circuit changeable in response to the switching control signal, for supplying both a starting static capacitance and an operative static capacitance to the supplementary winding in the starting of the compressor, and for supplying only the operative static capacitance after the starting of the compressor, the static capacitance controlling part having an internal function for preventing a surge current caused by a momentary discharge.

10. The device as claimed in claim 9, wherein the current controlling part supplies a current to the main winding in a gradually increasing direction from an initial starting of the compressor to completion of the starting of the compressor in response to the switching control signal.

11. The device as claimed in claim 9, wherein the current controlling part includes:
- a second switch for switching on/off between an output contact point of the first switch and the main winding in response to the switching control signal; and
- a phase controlling part connected in parallel to the second switch between an input contact point and an output contact point thereof for controlling a phase of a voltage to be supplied to the main winding depending on a switching on/off state of the second switch and the phase control signal; and wherein the static capacitance controlling part includes:
- a third switch having an input terminal connected both to an output contact point of the current controlling part and an output contact point of the second switch for switching on/off in response to the switching control signal;
- a negative temperature coefficient resistor having an input terminal connected to an output contact point of the third switch; and
- a static capacitance generating part having a first input terminal connected to an output terminal of the negative temperature coefficient resistor, a second input terminal connected to an output contact point of the first switch, and an output terminal connected to the supplementary winding, for providing a required static capacitance to the supplementary winding depending on switching on/off states of the second switch and the third switch.

12. The device as claimed in claim 11, wherein, in response to a variable phase control signal, the phase controlling part is turned on longer if the utility voltage is lower than a reference utility voltage, and is turned on shorter if the utility voltage is higher than the reference utility voltage.

13. The device is claimed in claim 11, wherein the second switch is switched in response to the switching control signal such that an output contact point of the first switch and the main winding are connected through the phase controlling part in the starting of the compressor and the output contact point of the first switch and the main winding directly after the starting of the compressor; and
- the third switch is switched in response to the switching control signal to connect both an output terminal of the phase control signal and an output contact point of the first switch connected to the supplementary winding through the static capacitance generating part so that the static capacitance generating part generates the starting static capacitance and the operating static capacitance in starting of the compressor, and to connect only an output contact point of the first switch to the supplementary winding through the static capacitance generating part so that the static capacitance generating part generates a relatively small operating static capacitance.

14. The device as claimed in claim 11, wherein the phase controlling part is a triac for controlling a phase of the voltage supplied to the main winding in response to the phase controlling signal.

15. The device as claimed in claim 11, wherein the static capacitance generating part includes:
- a starting capacitor connected between an output terminal of the negative temperature coefficient resistor and the supplementary winding; and
- an operating capacitor connected between an input contact point of the first switch and the supplementary winding, and connected in parallel to the starting capacitor.

16. A device for controlling supply of current and static capacitance to the compressor comprising:
- a first controlling part for generating a driving turn on/off signal for the compressor according to a user's selection;
- a first switch for supplying, or cutting off the supplying of a utility voltage to the compressor in response to the driving turn on/off signal;
- a temperature sensing part for sensing an external temperature and forwarding the sensed temperature;
- a second controlling part for generating a phase control signal and a switching control signal for the utility voltage depending on a size of the utility voltage and the external temperature;
- a current controlling part having an internal circuit changeable in response to the switching control signal and the phase control signal for providing a small sized limited current to the supplementary winding of the compressor according to the phase control signal in starting of the compressor, and a current of the utility voltage to the main winding after the starting of the compressor; and
- a static capacitance controlling part having an internal circuit changeable in response to the switching control signal, for supplying both a starting static capacitance and an operative static capacitance to the supplementary winding in the starting of the compressor, and for supplying only the operative static capacitance after the starting of the compressor.

17. The device as claimed in claim 16, wherein the current controlling part supplies a current to the main winding in a gradually increasing direction from an initial starting of the compressor to completion of the starting of the compressor in response to the switching control signal.

18. The device as claimed in claim 16, wherein the current controlling part includes:
   a second switch for switching on/off between an output contact point of the first switch and the main winding in response to the switching control signal and
   a phase controlling part connected in parallel to the second switch between an input contact point and an output contact point thereof for controlling a phase of a voltage to be supplied to the main winding depending on a switching on/off state of the second switch and the phase control signal; and
   wherein the static capacitance controlling part includes:
      a third switch having an input terminal connected both to an output contact point of the current controlling part and an output contact point of the second switch for switching on/off in response to the switching control signal; and
      a static capacitance generating part having a first input terminal connected to an output contact point of the second switch, a second input terminal connected to an output contact point of the first switch, and an output terminal connected to the supplementary winding, for providing a required static capacitance to the supplementary winding depending on a switching on/off state of the third switch.

19. The device as claimed in claim 18, wherein, in response to a variable phase control signal, the phase controlling part is turned on longer if the utility voltage is lower than a reference utility voltage, and is turned on shorter if the utility is higher than the reference utility voltage.

20. The device as claimed in claim 18, wherein the second switch is switched in response to the switching control signal such that an output contact point of the first switch and the main winding are connected through the phase controlling part in the starting of the compressor and the output contact point of the first switch and the main winding directly after the starting; and
   the third switch is switched in response to the switching control signal to connect both an output terminal of the phase control signal and an output contact point of the first switch connected to the supplementary winding through the static capacitance generating part so that the static capacitance generating part generates a great static capacitance in the starting of the compressor, and to connect only an output contact point of the first switch to the supplementary winding through the static capacitance generating part so that the static capacitance generating part generates a relatively small static capacitance.

21. The device as claimed in claim 18, wherein the phase controlling a phase of the voltage supplied to the main winding in response to the phase controlling signal.

22. The device as claimed in claim 18, wherein the static capacitance generating part includes:
   a starting capacitor connected between an output contact point of the third switch and the supplementary winding; and
   an operating capacitor connected between an input contact point of the first switch and the supplementary winding, and connected in parallel to the starting capacitor.

23. The device as claimed in claim 16, wherein the temperature sensing part is a thermistor for converting the external temperature to a voltage.

24. A device for controlling supply of current and static capacitance to a compressor comprising:
   a first controlling part for generating a driving turn on/off signal for the compressor according to a user's selection;
   a first switch for supplying, or cutting off the supplying of a utility voltage to the compressor in response to the driving turn on/off signal;
   a second controlling part for generating a phase control signal and a switching control signal for the utility voltage depending on a size of the utility voltage, and providing a signal for displaying a state of a current value according to the current value to a main winding;
   a current controlling part having an internal circuit changeable in response to the switching control signal and the phase control signal for providing a small sized limited current to the supplementary winding of the compressor according to the phase control signal in starting of the compressor, and a regular sized current of the utility voltage to the main winding after the starting of the compressor; and
   a current detecting part connected to an output side of the current controlling part for detecting a current to the main winding of the compressor and providing to the second controlling part;
   a display part for displaying a state of the current to the main winding in response to the display signal; and
   a static capacitance controlling part having an internal circuit changeable in response to the switching control signal, for supplying both a starting static capacitance and an operative static capacitance to the starting supplementary winding in the starting of the compressor, and for supplying only the operative static capacitance after the starting of the compressor.

25. The device as claimed in claim 24, wherein the current detecting part is a resistor connected between the current controlling part and the main winding.

26. The device as claimed in claim 24, wherein the display part is an LED.

27. The device as claimed in claim 26, wherein, in response to the display signal, the LED flashes if the current to the main winding is greater than the preset first overcurrent, turns on if the detected current is lower than the preset first overcurrent and greater than a preset second overcurrent (the first overcurrent>the second overcurrent), and turns off if the detected current to the main winding is lower than the preset second overcurrent.

28. The device as claimed in claim 24, wherein the current controlling part supplies a current to the main winding in a gradually increasing direction from an initial starting of the compressor to completion of the starting of the compressor in response to the switching control signal.

29. The device as claimed in claim 24, wherein the current controlling part includes:
   a second switch for switching on/off between an output contact point of the first switch and the main winding in response to the switching control signal; and
   a phase controlling part connected in parallel to the second switch between an input contact point and an output contact point thereof for controlling a phase of a voltage to be supplied to the main winding depending on a switching on/off state of the second switch and the phase control signal; and
   wherein the static capacitance controlling part includes:
      a third switch having an input terminal connected both to an output contact point of the current controlling part and an output contact point of the second switch for switching on/off in response to the switching control signal; and a static capacitance generating part having a first input terminal connected to an output contact point of the second switch, a second input terminal connected to an output contact point of the first switch, and an output terminal connected to the supplementary winding, for providing a required static capacitance to the supplementary winding depending on a switching on/off state of the third switch.

30. The device as claimed in claim 29, wherein, in response to a variable phase control signal, the phase controlling part is turned on longer if the utility voltage is lower than a reference utility voltage, and is turned on shorter if the utility voltage is higher than the reference utility voltage.

31. The device as claimed in claim 29, wherein the second switch is switched in response to the switching control signal such that an output contact point of the first switch and the main winding are connected through the phase controlling part in the starting of the compressor and the output contact point of the first switch and the main winding directly after the starting of the compressor; and the third switch is switched in response to the switching control signal to connect both an output terminal of the phase control signal and an output contact point of the first switch connected to the supplementary winding through the static capacitance generating part so that the static capacitance generating part generates a starting static capacitance and an operating static capacitance in the starting of the compressor, and to connect only an output contact point of the first switch to the supplementary winding through the static capacitance generating part so that the static capacitance generating part generates only an operating static capacitance after the starting of the compressor.

32. The device as claimed in claim 29, wherein the phase controlling part is a triac for controlling a phase of the voltage supplied to the main winding in response to the phase controlling signal.

33. The device as claimed in claim 29, wherein the static capacitance generating part includes;

a starting capacitor connected between an output contact point of the third switch and the supplementary winding; and an operating capacitor connected between an input contact point of the first switch and the supplementary winding, and connected in parallel to the starting capacitor.

34. A device for controlling supply of current and static capacitance to a compressor comprising:

a first controlling part for generating a driving turn on/off signal for the compressor according to a user's selection;

a first switch for supplying, or cutting off the supplying of a utility voltage to the compressor in response to the driving on/off signal;

a second controlling part for generating a phase control signal and a switching control signal for the utility voltage variable with a size of the utility voltage and a current to the main winding of the compressor;

a current controlling part having an internal circuit changeable in response to the switching control signal and the phase control signal for providing a small sized limited current to the supplementary winding of the compressor according to the phase control signal in starting of the compressor, and a regular sized current of the utility voltage to the main winding after the starting of the compressor; and a current detecting part connected to an output side of the current controlling part for detecting a current to the main winding of the compressor and providing to the second controlling part; and a static capacitance controlling part having an internal circuit changeable in response to the switching control signal, for supplying both a starting static capacitance and an operative static capacitance to the starting supplementary winding in the starting of the compressor, and for supplying only the operative static capacitance after the starting of the compressor.

35. The device as claimed in claim 34, wherein the current detecting part is a resistor connected between the current controlling part and the main winding.

36. The device as claimed in claim 34, wherein the current controlling part supplies a current to the main winding in a gradually increasing direction from an initial starting of the compressor to completion of the starting of the compressor in response to the switching control signal.

37. The device as claimed in claim 34, wherein the current controlling part includes:

a second switch for switching on/off between an output contact point of the first switch and the main winding in response to the switching control signal; and a phase controlling part connected in parallel to the second switch between an input contact point and an output contact point thereof for controlling a phase of a voltage to be supplied to the main winding depending on a switching on/off state of the second switch and the phase control signal; and wherein the static capacitance controlling part includes:

a third switch having an input terminal connected both to an output contact.point of the current controlling part and an output contact point of the second switch for switching on/off in response to the switching control signal; and a static capacitance generating part having a first input terminal connected to an output contact point of the second switch, a second input terminal connected to an output contact point of the first switch, and an output terminal connected to the supplementary winding, for providing a required static capacitance to the supplementary winding depending on a switching on/off state of the third switch.

38. The device as claimed in claim 37, wherein, in response to a variable phase control signal, the phase controlling part is turned on longer if the utility voltage is lower than a reference utility voltage, and is turned on shorter if the utility voltage is higher than the reference utility voltage.

39. The device is claimed in claim 37, wherein the second switch is switched in response to the switching control signal such that an output contact point of the first switch and the main winding are connected through the phase controlling part in the starting of the compressor and the output contact point of the first switch and the main winding directly after the starting of the compressor; and the third switch is switched in response to the switching control signal to connect both an output terminal of the phase control signal and an output contact point of the first switch connected to the supplementary winding through the static capacitance generating part so that the static capacitance generating part generates a starting static capacitance and an operating static capacitance in starting of the compressor, and to connect only an output contact point of the first switch to the supplementary winding through the static capacitance generating part so that the static capacitance generating part generates only an operating static capacitance after the starting of the compressor.

40. The device as claimed in claim 37, wherein the phase controlling part is a triac for controlling a phase of the voltage supplied to the main winding in response to the phase controlling signal.

41. The device as claimed in claim 37, wherein the static capacitance generating part includes:
   a starting capacitor connected between an output contact point of the third switch and the supplementary winding for generating the starting static capacitance for a starting torque in starting of the compressor; and
   an operating capacitor connected between an input contact point of the first switch and the supplementary winding in series, and connected in parallel to the starting capacitor for generating the operating static capacitance in starting of the compressor and operation of the compressor.

42. A device for controlling supply of current and static capacitance to a compressor comprising:
   a first controlling part for generating a driving turn on/off signal for the compressor according to a user's selection;
   a first switch for supplying a utility voltage to the compressor in response to the driving turn on/off signal;
   a second controlling part for generating a switching control signal different in starting of the compressor and after the starting of the compressor;
   a current controlling part having a great initial resistance reversely proportional to a temperature thereof and an internal circuit changeable in response to the switching control signal for limiting the current of the utility voltage to the main winding of the compressor in the starting of the compressor, and providing the current of the utility voltage to the main winding after the starting of the compressor; and
   a static capacitance controlling part having an internal circuit changeable in response to the switching control signal, for supplying both a starting capacitance and an operative static capacitance to the starting supplementary winding in the starting of the compressor, and for supplying only the operative static capacitance after the starting of the compressor.

43. The device as claimed in claim 42, wherein the current controlling part supplies a current to the main winding in a gradually increasing direction from an initial starting of the compressor to completion of the starting of the compressor in response to the switching control signal.

44. The device as claimed in claim 42, wherein the current controlling part includes:
   a second switch having an input contact point connected to an output contact point connected to an output contact point of the first switch and an output contact point connected to the main winding for switching on/off between an output contact point of the first switch and the main winding in response to the switching control signal; and
   a negative temperature coefficient resistor having an input terminal connected to an output contact point of the first switch, an output terminal to the main winding, with the input terminal and the output terminal connected to an input contact point and the output contact point of the second switch respectively, for controlling the size of the current to the main winding in the starting of the compressor, and the static capacitance controlling part includes:
   a third switch having an input contact point connected to an output contact point of the second switch for switching on/off in response to the switching control signal; and
   a static capacitance generating part connected between an output contact point of the third switch and the supplementary winding, for providing static capacitances of the currents of the current controlling part and the utility voltage and an operating static capacitance of the current of the utility voltage to the supplementary winding in the starting of the compressor and providing the operating static capacitance of the current of the utility voltage to the supplementary winding after the starting of the compressor, depending on a switching on/off state of the third switch.

45. The device as claimed in claim 44, wherein the second switch changes an internal circuit of the current controlling part in response to the switching control signal so that an output contact point of the first switch and the main winding are connected through the phase controlling part in the starting of the compressor and the output contact point of the first switch and the main winding directly after the starting of the compressor; and
   the third switch changes an internal circuit of the static capacitance controlling part in response to the switching control signal such that the static capacitance generating part has a great static capacitance in starting of the compressor, and only a limited small static capacitance after the starting of the compressor.

46. The device as claimed in claim 44, wherein the static capacitance generating part includes:
   a starting capacitor connected between an output contact point of the third switch and the supplementary winding for providing the starting static capacitance of the current from the current controlling part to the supplementary winding for a starting torque in starting of the compressor; and
   an operating capacitor connected between the first switch and the supplementary winding, and connected in parallel to the starting capacitor for providing the operating static capacitance of the utility voltage to the supplementary winding in starting of the compressor and operation of the compressor.

47. A method for controlling supply of current and static capacitance to a compressor, comprising the following steps:
   (a) providing a utility voltage to the compressor;
   (b) during starting of the compressor, limiting a current of the utility voltage to a main winding of the compressor, and providing starting static capacitances of all of the currents to the main winding together with an operative static capacitance of the utility voltage to a supplementary winding of the compressor; and
   (c) after the starting of the compressor, providing an operative static capacitance of the current of the utility voltage to the supplementary winding, and the current of the utility voltage to the main winding as it is.

48. The method as claimed in claim 47, wherein the step (b) includes a step of limiting the current by controlling a phase of the current.

49. The method as claimed in claim 47, wherein, when a starting time period of the compressor is divided into an initial starting time period, a middle starting time period, and a final starting time period, the current to the main winding has a limited value of a first size in the initial starting time period, the current to the main winding has a value gradually increasing from a first size to a second size of the utility voltage in the middle starting time period, and the current to the main winding is maintained to be the second size as far as the compressor is in operation starting from the final starting time period.

50. The method as claimed in claim 47, further comprising the following steps:

(d) sensing a size of the utility voltage before putting the compressor into operation; and (e) controlling a phase of the current of the utility voltage according to the sensed size of the utility voltage for limiting the current to the main winding.

51. The method as claimed in claim 47, further comprising the following steps:

(f) sensing an external temperature; and (g) variably controlling the phase of the current to the main winding of the compressor according to the sensed external temperature.

52. The method as claimed in claim 51, wherein the step (g) includes the following steps:

(g1) comparing the sensed temperature value to a preset reference value according to seasons; and (g2) controlling the phase of current to the main winding according to a result of the comparison.

53. The method as claimed in claim 47, further comprising the following steps:

(h) sensing the current to the main winding at starting;

(i) comparing the sensed current to at least one preset reference value; and (j) displaying a state of the current to the main winding on a display according to a result of the comparison.

54. The method as claimed in claim 53, wherein the display is an LED.

55. The method as claimed in claim 53, wherein the step (j) includes the following steps:

flashing the display if the sensed current is greater than a first preset overcurrent, turning on the display if the sensed current is smaller than the first preset overcurrent and greater than a second preset overcurrent (the first overcurrent>the second overcurrent), and stopping operation of the display if the sensed current is smaller than the second preset overcurrent considering that the state of the current is normal.

56. The method as claimed in claim 47, further comprising the following steps:

detecting the current to the main winding during starting;

obtaining a starting voltage value from the detected current value;

comparing the stating voltage to at least one reference voltage value; and controlling a phase of the current to the main winding according to a result of the comparison.

57. The method as claimed in claim 56, wherein the step of controlling a phase includes a step of cutting off supply of the current to stop driving of the compressor if the starting voltage value is greater than a preset first reference voltage, controlling a phase of the current to reduce a size of the current if the starting voltage is lower than the first reference voltage and greater than a preset second reference voltage, for reducing a size of the current, and maintaining an initial phase of the current as it is if the starting voltage value is lower than the second reference voltage value.

58. The method as claimed in claim 47, wherein the size of the current to the main winding during starting of the compressor is limited by a negative temperature coefficient resistor.

59. The method as claimed in claim 47, wherein the size of the current to the main winding during starting of the compressor is limited by a triac.

60. The method as claimed in claim 59, wherein the triac is turned on longer by the variable phase control signal if the utility voltage is lower than a reference utility voltage, and is turned on shorter by the variable phase control signal if the utility voltage is higher than a reference utility voltage.

* * * * *